United States Patent [19]
Yanof et al.

[11] Patent Number: 5,734,384
[45] Date of Patent: *Mar. 31, 1998

[54] CROSS-REFERENCED SECTIONING AND REPROJECTION OF DIAGNOSTIC IMAGE VOLUMES

[75] Inventors: Jeffrey H. Yanof, Solon; Dominic J. Heuscher, Aurora, both of Ohio

[73] Assignee: Picker International, Inc., Highland Heights, Ohio

[*] Notice: The term of this patent shall not extend beyond the expiration date of Pat. No. 5,371,778.

[21] Appl. No.: 729,314

[22] Filed: Oct. 15, 1996

Related U.S. Application Data

[63] Continuation of Ser. No. 350,256, Dec. 5, 1994, abandoned, which is a continuation-in-part of Ser. No. 800,242, Nov. 29, 1991, Pat. No. 5,371,778, and Ser. No. 800,431, Nov. 29, 1991, abandoned.

[51] Int. Cl.$^6$ .................................................. G06T 17/40
[52] U.S. Cl. ........................................... 345/424; 345/419
[58] Field of Search .................................. 395/124, 127, 395/136; 378/901, 20; 382/131; 128/920; 345/424, 419

[56] References Cited

U.S. PATENT DOCUMENTS

| | | | |
|---|---|---|---|
| 4,259,725 | 3/1981 | Andrews et al. | 345/145 |
| 4,685,070 | 8/1987 | Flinchbaugh | 395/124 |
| 4,714,997 | 12/1987 | Crawford et al. | 128/653.1 |
| 4,835,688 | 5/1989 | Kimura | 395/124 |
| 4,858,129 | 8/1989 | Mori | 382/131 |
| 4,882,679 | 11/1989 | Tuy et al. | 128/653.1 |
| 4,984,157 | 1/1991 | Cline et al. | 395/124 |

(List continued on next page.)

OTHER PUBLICATIONS

Foley et al., Computer Graphics: Principles and Practice, 1990, pp. 204–209, 222–226, 229–242, 376–381, 405–408, 491, 549–551, 695–698.

Dunne et al., Fast Reprojection of Volume Data, Visualization in Biomedical Computing, 1990, pp. 11–18.

Preston, Jr., Computer Processing of Biomedical Images, Computer, May 1976, pp. 54–68.

(List continued on next page.)

Primary Examiner—Anton W. Fetting
Attorney, Agent, or Firm—Fay, Sharpe, Beall, Fagan, Minnich & McKee

[57] ABSTRACT

A CT scanner non-invasively examines a volumetric region and generates voxel values. A user adjustable 3D axis system defines mutually orthogonal sections and volume reprojections thus defining a cross reference relation between them. An affine transform translates and rotates the axis system from object space to image space whereby each axis defines the orientation of origin intersecting sections in one view port and the viewing direction of volume reprojections in another view port. An operator console selects an angular orientation of the coordinate axis. A cursor position designates coordinates in image space causing the cursor, typically crossed axes, to be displayed on a monitor at a corresponding location in each displayed image. The view port rotation and translation of the projected crossed cursors are reverse affine transformed to rotate and translate the axis system. While viewing and cross referencing the polyhedral volume reprojection, the cursor selects points along a curved object which are interpolated into a smooth curve to define curved section images. Multiple projection views define the medial axis within a straight or curved tubular structure. The medial axis generates transverse and longitudinal medial sections and sets of volume reprojections cross referenced to the projection views to generate the medial axis for side by side or fly through display.

31 Claims, 9 Drawing Sheets

U.S. PATENT DOCUMENTS

| | | | |
|---|---|---|---|
| 4,985,834 | 1/1991 | Cline et al. | 395/124 |
| 5,025,375 | 6/1991 | Sugawara | 395/124 |
| 5,042,077 | 8/1991 | Burke | 382/169 |
| 5,065,348 | 11/1991 | Kuragano et al. | 364/119 |
| 5,113,357 | 5/1992 | Johnson et al. | 395/124 |
| 5,113,490 | 5/1992 | Winget | 395/119 |
| 5,170,347 | 12/1992 | Tuy et al. | 395/119 |
| 5,226,113 | 7/1993 | Cline et al. | 395/124 |
| 5,250,933 | 10/1993 | Beaudin et al. | 345/115 |
| 5,265,012 | 11/1993 | Amans et al. | 382/128 |
| 5,276,785 | 1/1994 | Mackinlay et al. | 395/127 |
| 5,283,859 | 2/1994 | Quarendon et al. | 395/127 |
| 5,297,074 | 3/1994 | Tuy et al. | 364/422 |
| 5,309,356 | 5/1994 | Nishide et al. | 382/131 |
| 5,313,567 | 5/1994 | Civanlar et al. | 395/124 |
| 5,325,472 | 6/1994 | Horiuchi et al. | 395/127 |
| 5,381,518 | 1/1995 | Drebin et al. | 395/124 |
| 5,428,725 | 6/1995 | Sugai et al. | 395/136 |

OTHER PUBLICATIONS

Robb et al., Interactive Display and Analysis of 3-D Medical Images, IEEE Transactions on Medical Imaging, Sep. 1989 pp. 217–226.

Foley et al., Fundamentals of Interactive Computer Graphics, 1982, pp. 262–265, 279–283.

Computer Graphics Handbook, Mortenson Copyright 1991, Industrial Press Inc.; pp. 12, 66–67.

Fundamentals of Three–Dimensional Computer Graphics, Alan Watt Copyright 1989, Addison–Wesley Publishers Ltd. pp. 21–22; 2–6.

Interactive Computer Graphics Functional, Procedural and Device–Level Methods Burger & Gillies; Copyright 1989 Addison–Wesley Publishers Ltd. pp. 145–156.

Cuve Fitting with Cubic Splines; Ashdown Dr. Dobb's Journal, Sep., 1986; pp. 24–30; 71; 81–83.

Computer Graphics: The Principles Behind the Art and Science Pokorny, et al.; Copyright 1989 Franklin, Beedle & Associates; pp. 56–69.

Hidden Surface Removal Using Polygon Area Sorting; Weiler, et al. pp. 214–222.

Computed Tomography of the Spine: Curved Coronal Reformations from Serial Images: Rothman, et al.; Radiology, Jan. 1984; pp. 186–190.

Essentials of Human Anatomy; Woodburne; Oxford University Press, 1983; p. 296.

Microsoft Windows User's Guide for the Windows Graphical Environment, Version 3.0; Microsoft Corporation 1985–1990; pp. 288–289.

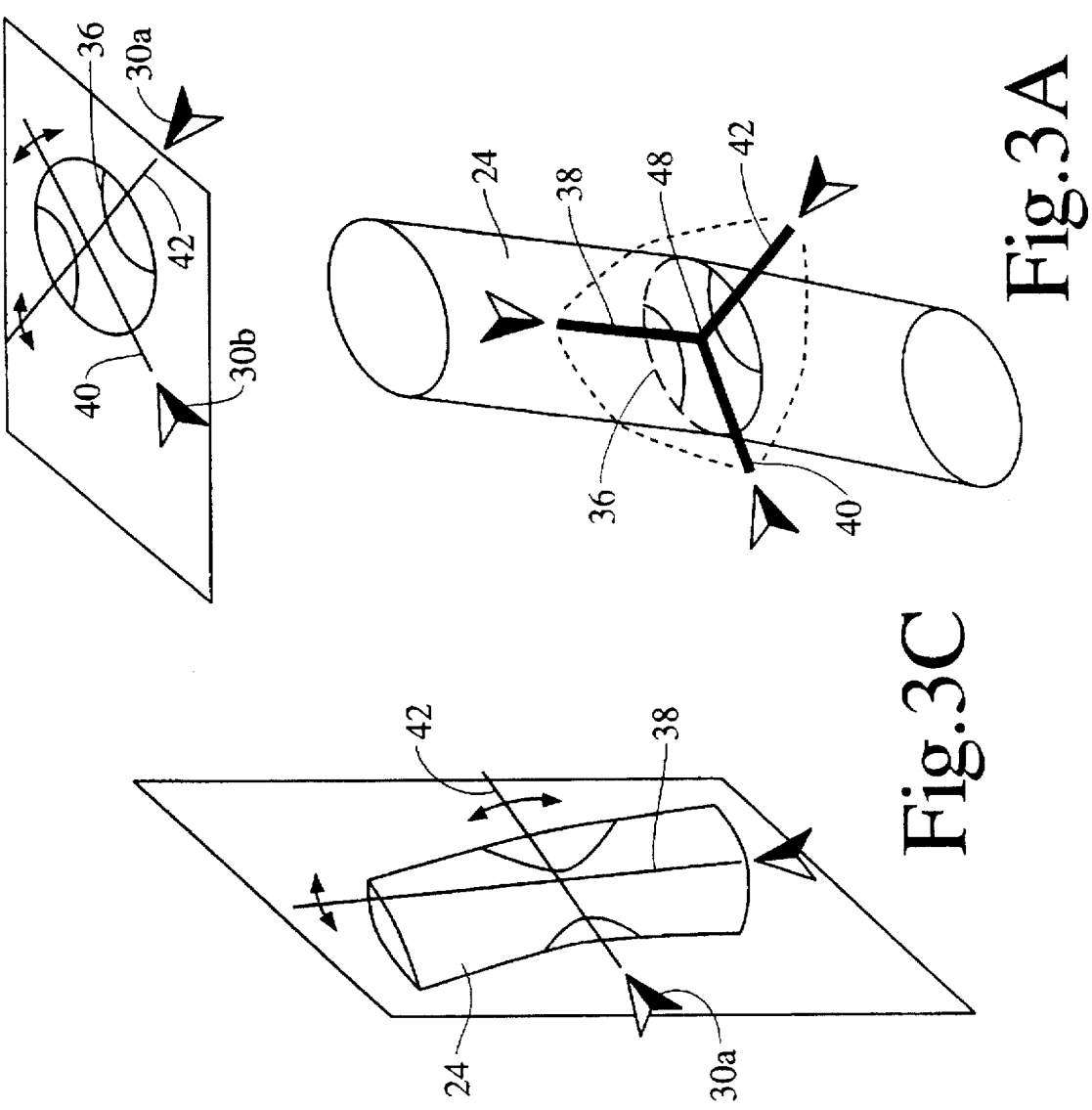

CROSS-REFERENCED SECTIONING AND REPROJECTION OF DIAGNOSTIC IMAGE VOLUMES

CROSS-REFERENCED SECTIONING AND REPROJECTION OF DIAGNOSTIC IMAGE VOLUMES

The present invention is a continuation of U.S. application Ser. No. 08/350,256, filed Dec. 5, 1994, abandoned which in turn is a continuation-in-part of U.S. application Ser. No. 07/800,242, filed Nov. 29, 1991, now U.S. Pat. No. 5,371,778 and U.S. application Ser. No. 07/800,431, filed Nov. 29, 1991, now abandoned.

BACKGROUND OF THE INVENTION

The present invention pertains to the image display art. It finds particular application in conjunction with the display of CT medical diagnostic images on video monitors and will be described with particular reference thereto. However, it is to be appreciated that the invention is also applicable to medical diagnostic images from magnetic resonance, nuclear, and other imaging modalities, to quality assurance and other three-dimensional, non-medical images, and the like. The invention is also applicable to hard copy displays, film image displays, and other display formats.

Heretofore, CT scanners have irradiated a planar region of a subject from various angles and detected the intensity of radiation passing therethrough. From the angle and radiation intensity information, two-dimensional image representations of the plane were reconstructed. A typical image representation included a 512×512 pixel array, although coarser and finer arrays are also known.

For three-dimensional imaging, the patient was moved along a longitudinal axis of the CT scanner either continuously for spiral scanning or incrementally, to generate a multiplicity of slices. The image data were reconstructed, extrapolating or interpolating as necessary, to generate CT numbers corresponding to each of a three-dimensional array of voxels. For simplicity of illustration, each of the CT numbers can be conceptualized as being addressable by its coordinate location along three orthogonal axes, e.g. x, y, and z-axes of the examined volume.

Typically, the volume data was displayed on the planar surface of a video monitor. Various planar representations of the volume data are now commonly available. Most commonly, the examined volume was a six-sided prism or polyhedron with square or rectangular faces. The operator could select a display depicting any one of the six faces of the prism or any one of the slices through an interior of the prism along one of the (x,y), (x,z) or (y,z) planes. Some display formats also permitted oblique or curved planes to be selected. Display formats were also available which permitted two or three sides of the prism to be displayed concurrently on a two-dimensional (i,j) image plane with appropriate visual cues to give the impression of a perspective view in three dimensions. That is, the visible faces were foreshortened (or extended) and transformed from rectangles to parallelograms by a sine or cosine value of an angle by which the viewing direction was changed. In this manner, each face of the prism was transformed into its projection along the viewing direction onto the viewing plane. This gives the faces the appearance of extending either parallel to the viewing plane or video monitor screen or extending away from the screen at an oblique angle. Some routines added shading to give further visual cues of depth.

More specifically, the operator could typically cause a selected surface, such as a transverse (x,y) plane on the face (z=0) of the examined volume to be displayed. The operator could then cause a selected number of transverse planar slices to be peeled away or deleted by indexing along the z-axis ($z=1,2,3,\ldots,Z_{max}$) to view the interior transverse planes. The operator could then position the cursor on the (x,y) or transverse plane to select a coronal or (x,z) plane. The selected coronal plane would then be displayed. The operator would then position the cursor on the displayed coronal plane to select a sagittal or (y,z) plane. Prior art medical image workstations commonly permitted the transverse, coronal, or sagittal sections or views to be displayed concurrently in different view ports on the same screen.

Prior art workstations also permitted three-dimensional projections such as shaded surface projections (SSD) and volume reprojections (VRP). The volume of reconstructed images were reprojected using volume rendering techniques such as maximum ray intensity reprojection, or ray summation, or voxel opacity compositing. The volume reprojection views can show structures throughout the volume, regardless of which is closest or furthest from the observer, using semi-transparent surfaces. For a common application for volume reprojection, the patient receives an intra-venous injection of contrast media and is scanned quickly so that the voxels associated blood vessels are significantly increased in x-ray attenuation and are opacified. The opacified vasculature can be visualized using volume reprojection views with minimal editing of the data set. The operator could rotate the viewing direction and reposition the point of the object mapped to the screen center for the reprojection in order to visualize the entire volume of image data from the optimum angle(s).

Some workstations also permitted the three-dimensional projections (SSD and VRP) to be displayed concurrently with the sectional planes in yet another view port.

One disadvantage of prior art systems is they did not have a user friendly means of cross-referencing volume reprojections and sectional projections, generating sets of sections and reprojections, and making cross-referenced measurements from them.

The present invention contemplates a new and improved method and apparatus for displaying images which permits cross-referenced, real-time adjustment of planar or curved sections and volume reprojection views of volume data, and utilizing the advantages thereto.

SUMMARY OF THE INVENTION

In accordance with one aspect of the present invention, a volume object memory means is provided for holding data values indicative of each voxel of a volumetric region of the object. An affine transform means rotates, scales, and translates points including the origin of the user-adjustable coordinate system and points along a curved axis, lines including axes of the user-adjustable coordinate system, and surfaces of the volumetric region (object space) into transformed points, lines, and surfaces of a reprojection view when displayed on the pixels of a two-dimensional image plane or video display (image space). The transform means also supplies a reverse of the selected transform to transform the display pixels into corresponding locations of the object volumetric region. A video processor generates a video display of the data values that correspond to the reverse transformed locations in the volumetric region. An operator uses a cursor control means to move a cursor on the video display. The transform means also reversely transforms the origin and orientation of the user adjustable coordinate axis cursor from the image plane to a corresponding location in the volumetric region. A plane section defining means defines mutually orthogonal planes which intersect at the origin of the user adjustable coordinate system in the volumetric region. With the cursor control, the normal vectors to the displayed planar sections are selectively rotated relative to the axes. The video processor means receives data values from the object memory lying along each of the planes and converts them into a corresponding video image. Preferably, the video processor converts the volume-projection based two-dimensional reprojection image representation and the planar section data values into images which are displayed concurrently in a common video display.

In accordance with another aspect of the present invention, a volume-projection guided curved sectioning means is provided. More specifically, with the crossed-cursor, the operator selects points along a structure of interest within the volume reprojection view. A standard curve interpolation means, e.g., splines, is used to smooth the curve. An additional curved section through the curved structure may be defined analogously in an orthogonal volume reprojection view or by drawing a curve on the results of the first curved section. The additional curved section is input to a curved-section intersection means which determines a curved line which typically follows the medial axis of a curved, tube shaped structure, e.g. a tortuous blood vessel. A section and volume reprojection sequencer generates sets of sections which intersect longitudinally and transverse to the medial axis of the tubed-shaped structure.

One advantage of the present invention is that the relationship(s) among the volume reprojection view(s) and the sectional views can be fixed by a user adjustable 3-D coordinate-system whereby each of the three axes can represent both a viewing direction and a plane section normal vector. The operator can adjust the origin, angular orientation, and curvature of the axis using the projected origin and projected axis as reference cursors.

Another advantage of the present invention is that the operator can adjust the orientation and position of planar section views (e.g. to intersect an item or object of interest or to establish an obliquely oriented and arbitrarily located tri-section) by translating the projected origin cursor or by rotating the projected axis cursors of the adjustable coordinate system; whereby, the projected cursors are superimposed on a volume reprojection view(s) as a reference guide. The user adjustable coordinate system can also be projected on 3-D shaded surface volumes, polyhedral sectional volumes, or merely the orthogonal sections themselves to use them as reference guides.

Another advantage of the present invention is that the operator can adjust the viewing directions of the volume reprojection views (e.g. perpendicular to a tubed shaped structure of interest) by rotating the projected axis cursor(s) of the adjustable coordinate system, and the operator can adjust the location of the volume reprojection's center point which projects to the center of the view port; whereby, the projected cursors are superimposed on a planar section view as a reference guide.

The cross-referencing system is established by making dual use of the user adjustable coordinate system origin and three axes as summarized below in TABLE 1:

TABLE 1

| | Origin Used As ... | Each Axis Used As ... |
|---|---|---|
| Volume Reprojection | Centering Position In View Port | Viewing Direction |
| Planar Section | Intersecting Point on Plane | Normal Vector to Plane, Intersection of Two Other Planes |

TABLE 1

Another advantage of the present invention is that it allows the operator to specify a curved section intersecting an adjustable planar polyhedral volume (i.e. a polyhedron resulting from the intersection of half-spaces formed by a set of planes delineating a volume of interest) using its reprojection as a reference guide. The reprojection helps visualize the entire curved structure and adjustments to the planar polyhedron can be used to exclude unwanted, obscuring structures from the reprojection. In this manner, the reprojection speed is enhanced.

Another advantage of the present invention is that the operator can use multiple reprojections or sections to establish a medially located straight or curved axis within a straight or curved tube shaped object using volume reprojection views, or a combination of volume reprojection views and planar section views as a reference guide.

Another advantage of the present invention is that a sequence of straight or curved longitudinal sections can be automatically generated which intersect and have angular-spaced normal vectors perpendicular to the medial axis. The sequence can be displayed in a rapid cine sequence in the same view port or side-by-side in separate view ports.

Another advantage of the present invention is that a sequence of volume reprojections can be automatically generated side-by-side or in rapid cine which have regularly spaced viewing directions perpendicular to the medial axis at a point or points of interest along the medial axis.

Another advantage of the present invention is that a set of sections which are transverse to the straight or curved medial axis can be automatically generated, for a straight or curved tube-shaped object. The transverse sequence can be cine displayed in the same view port to visualize a slice-wise fly-through, or in side-by-side view ports, while optionally using a selected volume projected view as a cross-referencing guide.

Another advantage of the present invention is that the set of viewing directions segmentally coincidental with the medial axis can be used to generate a volume projective or shaded surface fly-through, while optionally using a selected transverse section as a cross-reference guide.

Another advantage of the present invention is that the operator can establish the medial axis within a hierarchy of branching straight or curved tube-shaped objects such as the vessels of a vascular tree.

Another advantage of the present invention is that it permits the sectional or volume views to be used to establish a volume of interest which contains a three-dimensionally convex or concave item or subregion of interest such as a vessel with multiple branches.

Another advantage of the present invention is that it allows the cross-sectional area of a tube-shaped object to be automatically determined at selected or regular intervals along the medial axis of the object for subsequent plotting in cartesian coordinates.

Another advantage of the present invention is that the user can establish a volume of voxel connected or contiguous with or in proximity with the voxel at the origin cursor or intersected by the medial axis of a tube shaped structure for subsequent display or analysis.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIGS. 3A, 3B, 3C, and 3D provide a diagrammatic illustration of the relationship among the three reprojection views : where the arrows represent the reprojection views-two viewing at right angles to the tube-shaped structure and one along its long axis. Reprojection views are cross-reference to each other and the mutually orthogonal trisection illustrated in FIGS. 4A, 4B, and 4C using the user-adjustable coordinate system;

DETAILED DESCRIPTION OF THE PREFERRED EMBODIMENTS

Figure 1:
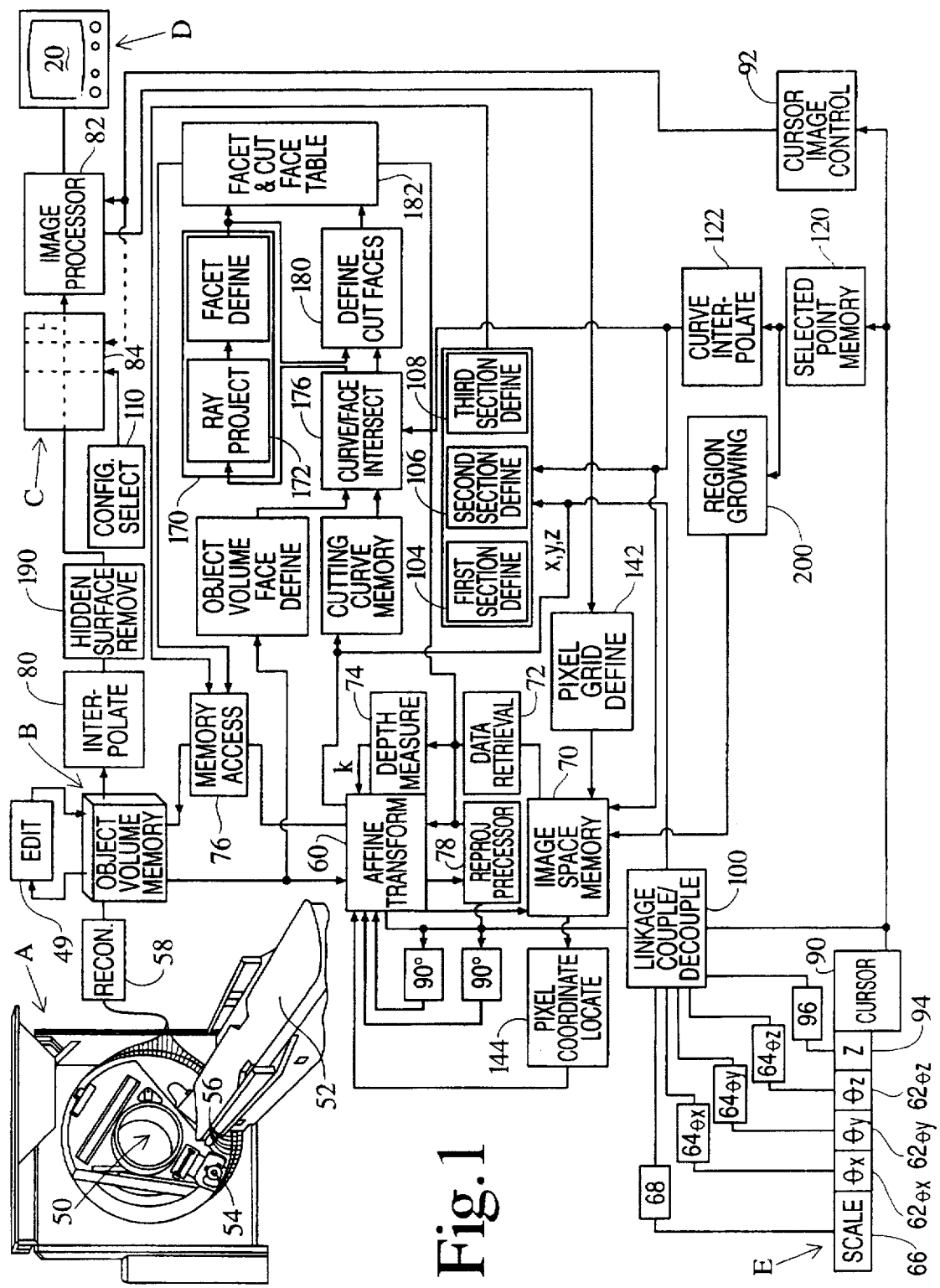
FIG. 1 is a diagrammatic illustration of an image data display system in accordance with the present invention.

With reference to FIG. 1, a diagnostic imaging device A non-invasively examines a volumetric region of a subject and generates a data value indicative of each voxel within a polyhedron. The data values corresponding to voxels of the polyhedron are stored in a three-dimensional object memory means B. The shape and size of the volumetric region is generally defined by the diagnostic imaging device. In the preferred embodiment, the examined region is a rectangular prism, i.e. a six-sided volume having rectangular or square orthogonal faces. The volumetric region is defined by x, y, and z-coordinates which are defined in terms of a transverse plane, coronal plane, and sagittal plane of a patient or other examined object. For each voxel within the polyhedral examined volumetric region, the imaging device A generates a data value, e.g. a CT number, which, for simplicity of illustration, is retrievable from the object memory B by addressing the object memory with the (x,y,z) coordinates of the voxel. A data processing system C processes the three-dimensional object data to generate a video display D in accordance with instructions input by the operator on an operator control console or system E.

Figure 2:
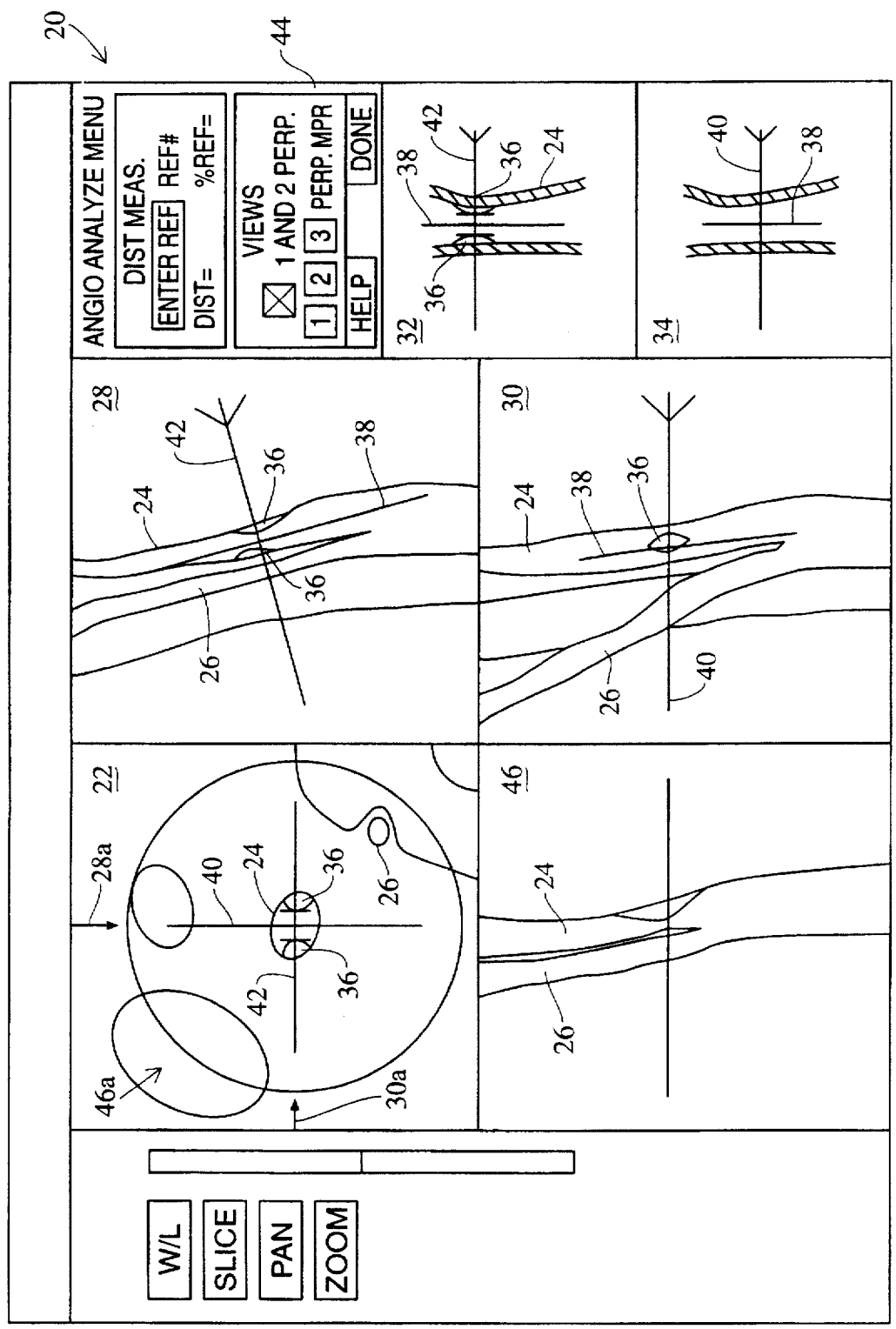
FIG. 2 is a diagrammatic illustration of a preferred video display generated by the present invention based on the user-adjustable 3-D coordinate system.

With reference to FIG. 2, the video display D includes a video display screen 20 having a plurality of ports. The number of ports is selectively increased or decreased to accommodate the number of images the operator selects for concurrent display. That is, a selected image of particular interest can be enlarged to fill all or substantially the whole screen, or the screen is divided into ports of equal or adjustable sizes. In the embodiment illustrated in FIG. 2, the display includes a first port 22 which illustrates a thin transverse section through an artery having branches 24 and 26. Three additional windows 28 and 30 have three-dimensional maximum intensity reprojections viewed along axis directions 28a and 30a, respectively, referenced in the transverse vascular viewing port 22, and in view ports 32 and 34 containing longitudinal sections. As explained herein below, the reprojection directions are adjustable in the sectional viewing ports 22, 32, and 34 using them as reference guides. In the illustrated embodiment, there is a blockage 36 in the artery branch 24 which is of particular interest. Typically, the operator would adjust the viewing directions to view perpendicular to the artery at the blockage. As the viewing directions are changed in the first viewing port 22, the coordinate axis system and the respective images in the other view ports change correspondingly.

With further reference to FIG. 2 view ports and 30, the projected coordinate axes have been rotated so that the sectional planes in view ports 32 and 34 intersect the vessel longitudinally. This causes axis 38 to reside medially within the vessel and causes axes 40 and 42 to reference the transverse vascular view. View ports 32 and 34 illustrate slices along planes defined by axes (38, 42) and (38, 40), respectively, in the other images. In the illustrated embodiment, the images in view ports 32 and 34 are magnified to facilitate measurement of the linear extent of the blockage. The measurement can also be make simultaneously in the reprojection view ports which are perpendicular to the measurement axis. An additional port 44 includes keyboard, mouse, or other operator input device selectable instructions for changing the views, making measurements, and the like.

With further reference to FIG. 2, a view port 46 illustrates a maximum intensity reprojection with view direction 46a which is rotated about axis 38 which is at right angles to axis 38 but is not necessarily at right angles to 28a and 30a. View port 46 can also be used to view the volume reprojection along axis 38.

Figure 4A:
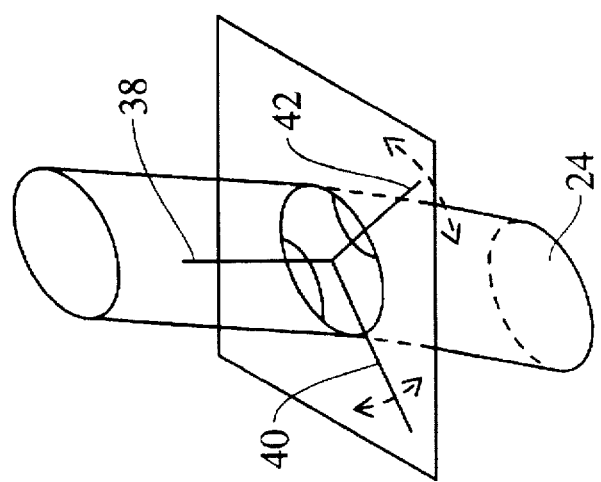
FIGS. 4A, 4B, and 4C illustrate an orthogonal multiplanar reformatted tri-section through the adjustable origin of the coordinate system: the two longitudinal sections and one transverse sections of the trisection are cross-reference to each other and with the three reprojection views in FIGS. 3A, 3B, and 3C whereby the arrows indicate the viewing directions.
Figure 4B:
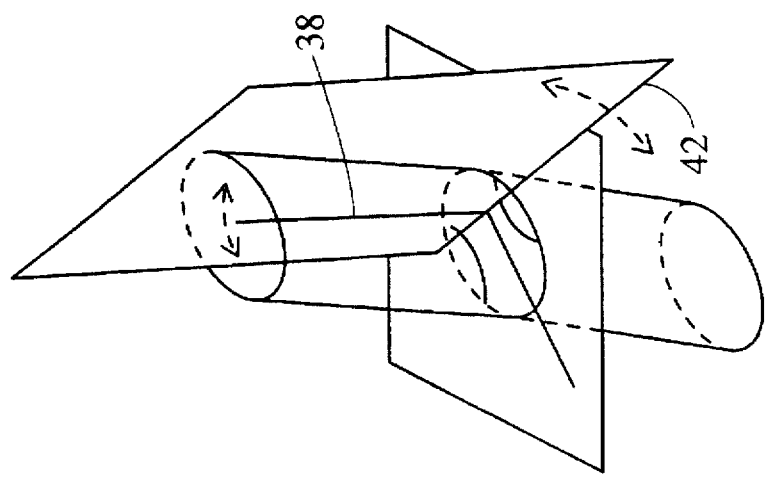
Figure 4C:
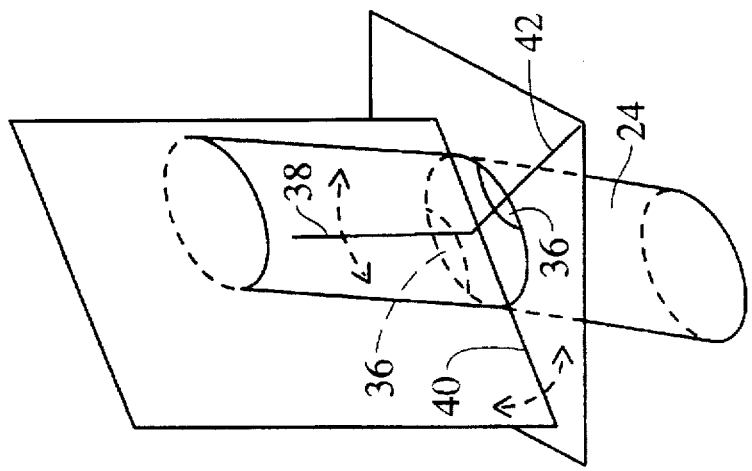

With reference to FIGS. 3A–3D and TABLE 1, the operator controlled cursor or centerpoint of a user adjustable, projected coordinate system 48, i.e., the zero origin, is disposable on a selectable location in any of the volume reprojected or planar section images. As the origin of the coordinate system is moved using its projection in one of the volume or section images as a reference guide, it modifies the position of the planar sections formed by axes (38,40), (38,42), and (40,42) to form the longitudinal sections in FIGS. 4B and 4A, and the curved-structure-transverse section in FIG. 4C in the other view ports, and modifies the centering position of the volume reprojection views. Specifically, modification of the origin updates the position of the volume tri-section which is displayed such that each plane section has its normal vector perpendicular to the screen in its view port, since each axis of the user adjustable coordinate system and its origin defines the position and orientation of a planar section. In the preferred embodiment, the straight axis coordinate system is constrained to three orthogonal axes. For example, moving the origin cursor to a voxel within region 36 using any of the reprojection or section views as a reference guide, the illustrated intravascular blockage, the longitudinal and transverse sections shifts from the center of the vessel to intersect this point in FIGS. 4A, 4B, and 4C. Also, the reprojection views shifts such that the voxel associated with the origin cursor is screen center.

The user adjustable, projected coordinate system is also rotatable about any of the coordinate axes. Typically, each of the three slice images is orthogonal to one of the axes, and parallel with two of the axis, and intersects the origin. The slice images are rotatable about the origin and the axis which is perpendicular to each of the slice images. As the projected coordinate system is rotated about one axis, the other two axis and hence the other two planar sections are re-oriented in their intersection the volume, then projected to be co-planar with screen. For example, if axis 38 is rotated about axis 42, remaining co-planar with the plane formed from (38,40) in FIG. 4B and using it of the reprojection in FIG. 3D as a reference guide, then rotates the coordinate system which modifies orientation of axes 38 and 40 thereby modifying viewing direction of the reprojection in FIGS. 3C and 3D, and changing the orientations of the sections in FIGS. 4B and 4A.

Also, since each axis can be used as a viewing direction for a volume projected image, rotation about an axis of the coordinate system modifies the viewing direction of one or two volume reprojections, depending of the number of volume reprojections shown in supplemental view ports. In the preferred embodiment, the rotation is implemented by the operator using the mouse. More specifically, the operator clicks the cursor on one of the axes or a preselected box superimposed one of the axes and drags it to rotate the axis and therefore the coordinate system. Each of the images which becomes changed during the rotation is reprojected or redefined such that the rotation of the reprojection image(s) appears to the operator to occur in real time.

The user typically uses a cross-referenced combination of the section views, referenced as lines on the volume reprojection views, and the volume reprojection views, referenced as arrow icons on the section views, to search for diagnostically useful and helpful section and volume reprojection directions. If the coordinate system is adjusted such that two of the section planes intersect along a line generally centrally or medially along the artery, the operator can rotate about the vascular axis to form a radial set of longitudinal cut sections through the vessel, and the operator can step the third plane image sequentially along the common axis to create the appearance of moving along or through the artery.

Of course, examination is not limited to contrast-media enhanced arteries. Arteries are shown merely by way of example. Numerous other internal tissue types are also amenable to viewing with this procedure, such as lumbar vertebrae, various internal organs particularly the colon, the head and neck, and the like. The user adjustable coordinate axis system is particularly advantageous for planning and verifying the trajectory for the fine needle biopsy of imaged tissues which are suspected as cancerous. The coordinates are rotated and positioned such that one of the coordinate axes extends along the planned trajectory of the biopsy needle. The interventionalist can view the two sections which longitudinally intersect the virtual needle and one section which is transverse to the virtual needle and its planned trajectory. Positioning and targeting the origin at the point to be biopsied assists in calculating depths and distances. The operator can again step through the transverse virtual needle slices or the orthogonal volume reprojections to the biopsy direction to ascertain what other tissues or structures intersect the virtual or proposed biopsy path. If the proposed biopsy path is obstructed, the axis is adjusted and the procedure repeated until a satisfactory biopsy path is determined. Similarly, the present system could be used for guiding the trajectory of an orthopaedic screw to be used for the fixation of disarticulated joints and bones. In addition to avoiding critical structures such as blood vessel and nerves within, for example, the sacrum during a sacral-iliac fixation, the trajectories and locations of fixation screws are optimally located within both the sacral and iliac bones.

When the examined structure does not coincide with a planar section and it is desirable for the operator to intersect the structure along a curve or establish a curved medial axis or trajectory to a tube shaped structure axis, curved sections through the polyhedral volume are preferred. The operator can specify the curve using a volume reprojection of the polyhedral volume as a reference guide. Similarly, 3-D shaded surfaces or planar sections can be used as a guide.

With reference again to FIG. 1, the examined volumetric region may not coincide precisely with the region that the operator wants to examine. Other tissues and structures such as air and the patient couch, are commonly examined and imaged along with the patient. The operator can adjust the planar sides, transverse, sagittal, coronal, or oblique, of the polyhedral volume prior to its volume reprojection (e.g. using maximum ray intensity). This removes unwanted structures from and speeds up the volume reprojection.

Figure 6B:
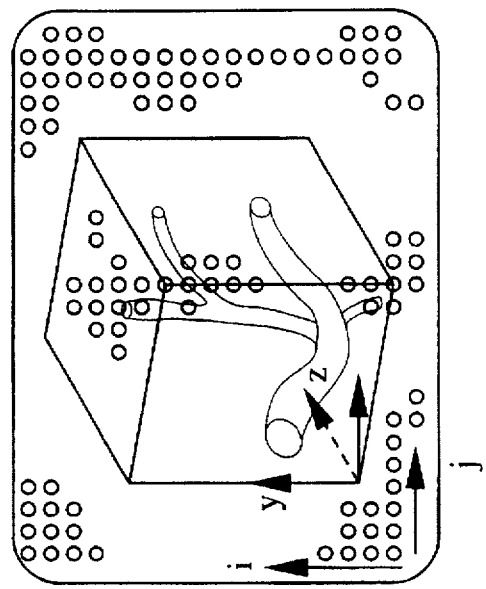
FIGS. 6A–6H illustrate cutting a polyhedral volume reprojection image, sectional sides transparent, with branching tube-shaped structure and a curved cutting plane which intersects the sides of the polyhedral volume and the branching tube shaped structure; and, FIGS. 7A, 7B, 7C, and 7D illustrate curved cutting through a tube shaped object within a polyhedral volume as seen by the operator, the establishment of its medial axis, and the generation of a set of longitudinal curved planes based on the medial axis.
Figure 6D:
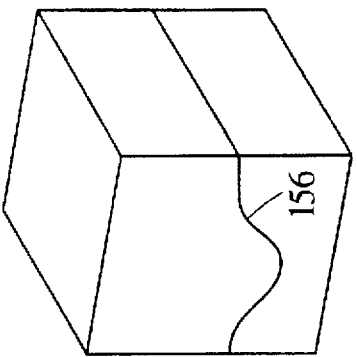
Figure 6A:
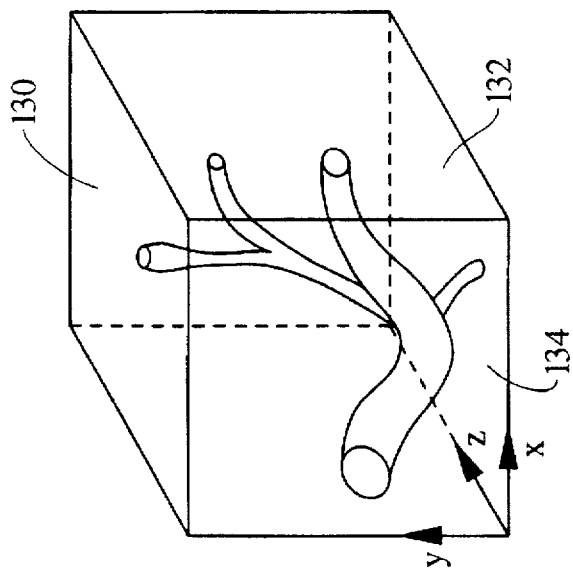
Figure 6C:
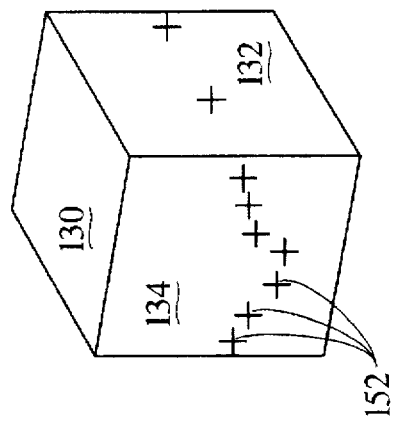

The reprojection of the polyhedral volume, FIG. 6A, using maximum ray intensity or other suitable reprojection method, can be used by the operator to superimpose a curved line representing a curved section which intersects the planar polyhedral volume through a curved structure of interest. Using the reprojection of the polyhedral volume for the curve specification can have advantages over using views based on the outer single-voxel thick sections of the planar polyhedron itself: in the reprojections, the entire curved structure of interest contained within the planar polyhedral volume may be visible in the polyhedral reprojection due to its utilization of transparency; thereby providing a complete reference guide for the specification of a curved section through the polyhedron which intersects the curved structure. A curve cutting means 49 enables the operator to form curved sections which intersect the polyhedral volumetric region using a volume reprojection of the polyhedral volume as a reference guide, or while viewing the planar polyhedral volume from the same viewing direction simultaneously in another view port. As shown in FIGS. 6C and 6D, the 2-D curve specified by the operator is back-projected to intersect the planar polyhedral volume along the same direction as the reprojection.

Figure 5:
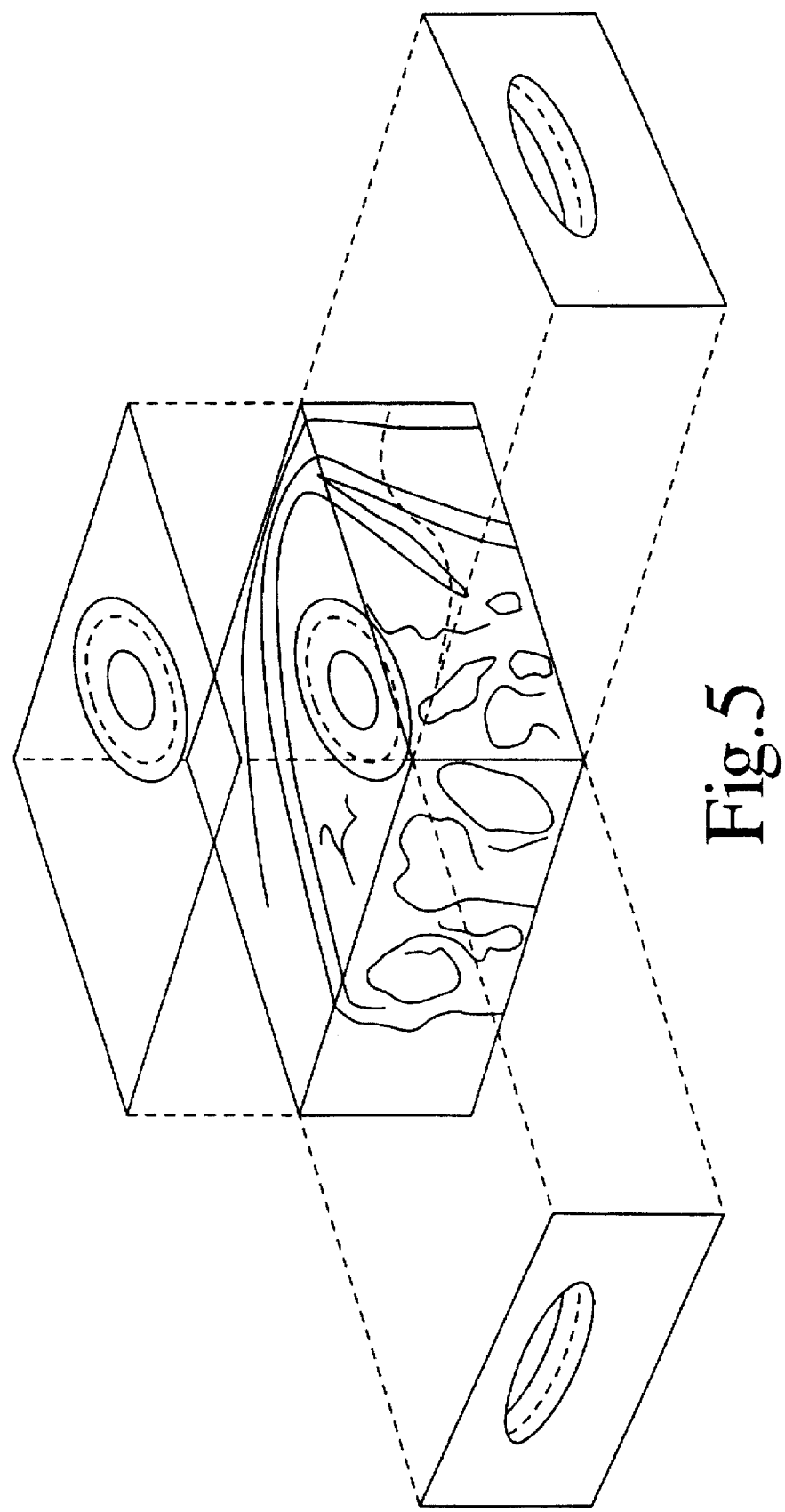
FIG. 5 illustrates a polyhedral volumetric sectional view with a user rotatable axis coordinate system.

Similarly, as discussed below with reference to FIGS. 7A–7D, multiple volume reprojections of the polyhedral volume can also be used by the operator to specify a 3-D medial axis of a tube-shaped object within the planar polyhedron as the intersection of a minimum of two curved surfaces. For a single curved cut referenced on a volume reprojection view, the curved surface is formed as an intersection with the polyhedral volumetric region. A volumetric region edited into a polyhedron with at least one oblique surface and viewed from a distance is illustrated in FIG. 5.

With continuing reference to FIG. 1, the non-invasive examination means A, in the illustrated embodiment, is a CT scanner. However, other sources of three dimensional image data both outside the medical imaging field and in the medical imaging field, such as magnetic resonance imagers, are contemplated. The non-invasive medical diagnostic apparatus A includes an examination region 50 for receiving the subject supported on a patient couch or support 52. An irradiating means 54, such as an x-ray tube, magnets, or radio frequency coils, irradiates the patient. A radiant energy receiving means 56, such as radiation detectors, radio frequency receiving coils, or the like, receive medical diagnostically encoded radiant energy. In the illustrated CT scanner example, the source of radiant energy is an x-ray tube which generates a fan-shaped beam of x-rays. The fan-shaped beam of x-rays passes through the subject in the examination region 50 impinging upon a ring of x-ray detectors of the radiant energy detection means 56. The x-ray tube is mounted for rotation by a motor or other rotating means about the examination region such that the patient is irradiated from a multiplicity of directions. The radiation detectors are positioned either in a stationary ring surrounding the examination ring or in an arc which rotates with the x-ray tube to receive the radiation that has traversed the patient.

An image reconstruction means 58 reconstructs an image representation from the received radiation. For example, the image reconstruction means may reconstruct a 512×512 array of data values, each data value being representative of a radiation transmissive property of a corresponding voxel of the one plane or slice of the volumetric region. The patient couch is indexed axially through the examination region between scans to generate a plurality of slices of image data. Optional, the patient couch may be translated continuously such that the x-ray beam passes through the patient along a spiral path. If spiral data is generated, a conventional, spiral data reconstruction means is utilized to convert the spiral data into data values corresponding to each of a three-dimensional orthogonal array of voxels, e.g., an x, y, z-array where x, y, and z are the coordinate axes of object space. Object space is the (x,y,z) coordinate system of the patient in the scanner; whereas, image space is the (i,j,k) coordinate system of the projection images presented on the display 20.

The data processing system C includes a transform means 60 which translates, rotates, and scales coordinates including the origin of the user adjustable coordinate system, vertices of the planar polyhedron, and vertices of curved sections, lines including the axes of the coordinate system, curves, and surfaces from object space to image space and reversely transforms locations, lines, curves, and surfaces from image space to object space. More specifically, the affine transform is a matrix which translates coordinates or vectors x, y, z in object space to corresponding coordinates or vectors i, j, k in image space, i.e.:

$$[x,y,z] \begin{bmatrix} \text{AFFINE} \\ \text{TRANSFORM} \\ \text{MATRIX} \end{bmatrix} = [i,j,k]. \quad (1)$$

Conversely, the reverse of the affine transform matrix converts coordinates or vectors in image space to corresponding coordinates or vectors in object space, i.e.:

$$[i,j,k] \begin{bmatrix} \text{REVERSE} \\ \text{AFFINE} \\ \text{MATRIX} \end{bmatrix} = [x,y,z]. \quad (2)$$

For curved sectioning, the volume reprojection can be rotated or translated prior to the specification of the curved line. This will also rotate the vertices associated with the planar polyhedral volume. The polyhedral volume can also be adjusted to contain a structure of interest prior to its volume reprojection. The k-coordinate of the polyhedral projection image is uniquely defined by the i, j-coordinate. For example, the planes (vertices) of the polyhedral volumetric region are mathematically defined in the process of editing the data or otherwise preparing the data for projection and possible display in another view port while the operator specifies the curve cut. Accordingly, the k value can be retrieved from a look-up table or otherwise uniquely calculated from this a priori information. When the viewing angle is changed, the values of the transform matrix are modified in accordance with trigonometric functions of the angle of rotation.

The operator control means E includes a mouse, trackball, or other angular orientation input means $62_{\theta x}$, $62_{\theta y}$, and $62_{\theta z}$ for inputting a degree of rotation of the viewing angle about the x, y, and z-axes to rotate the reprojection and section images as illustrated by way of example in FIGS. 2–4. Viewing angle buffers $64_{\theta x}$, $64_{\theta y}$, and $64_{\theta z}$ store the selected viewing angle. A scale input means 66, preferably using a cursor to drag an indicator along a scale, controls enlargement and reduction of the viewed 3-D volume image. A scale or magnification buffer 68 stores the selected scale factor. Optionally, other controls may be provided for translating the viewed 3-D volume reprojection image.

The affine transform means 60 adds the indicated x, y, and z-translation factors, multiplies the length and angle of the polyhedral faces from the volume space by sine and cosine values of the indicated rotation angles, and multiplies the dimensions by the scale factor. An image space memory means 70 stores the transformed face polygons and a grid indicative of the (i,j) pixel locations on the video display D. A data retrieval means 72 identifies each pixel location which falls within one of the polygonal faces and determines its location relative to that polygon.

A depth from the viewing plane determining means 74 determines a depth or distance k in the viewing direction from the viewing plane to a point of intersection with a viewed voxel of the imaged volume. More specifically, the depth determining means 74 determines the distance from the cursor pixel of the viewing plane to a point of intersection with the underlying face. The depth may be determined, for example, from a look-up table addressed by (i,j), by the conventional ray tracing technique in which a length of a ray projected in the viewing direction from the corresponding pixel of the viewing plane to a point of intersection with the object is determined, or the like.

The data retrieval means 72 accesses the transform means 60 and the depth means 74 to cause the image space pixel locations to be transformed with the reverse of the transform indicated by the buffers 64, 66. The reverse transform of the (i,j,k) pixel location provides a corresponding (x,y,z) coordinate in object space. A memory access means 76 uses the object space coordinates to retrieve the corresponding data values from the object memory B.

A reprojection processor 78 reprojects 2-D reprojection images from the volume image data along a selected viewing direction. Conceptionally, a reprojection image is what a human would see looking through the entire volume as if each structure where semi-transparent albeit a loss of depth perception as in conventional radiography. In the case of maximum intensity reprojection, higher intensity voxels and objects, encountered along rays parallel with the viewing direction, overlay voxels of lower intensity regardless of which voxel is closest to the observer. Reprojection images are not to be confused with section images which conceptually represent a planar or curved slice can be as thin as a single voxel. A 3-D shaded surface or surface rendering depicts in two dimensions the surface of a 3-D object with shading or color added to provide visual clues as to surface shape and depth. Standard hidden surface removal techniques are used so that closer objects overlay further objects.

Although reversely transformed coordinates of the 3-D projection image can fall directly on voxels of object space, the coordinates in many instances will fall in between. To this end, an interpolating means 80 interpolates the data values corresponding to the two, four, or eight closest voxels to the reversely transformed coordinates, in inverse proportion to the relative proximity.

The retrieved, interpolated values from the object memory B are converted by a video processor 82 into a video display on a video display means D. If the video processor can generate images with more than one pixel format, it is connected with the image space memory 70 for supplying an indication of the selected pixel grid. Optionally, a video memory 84 may be provided. The video memory is segmented into portions corresponding to each of the video ports into which the data for the projection image is loaded. The video processor 82 then converts the data from the video memory into a video signal to drive the video display.

The operator control panel E further includes a cursor positioning means 90, such as a mouse or trackball for indicating the (i,j) location of the cursor relative to the projection image. A cursor image control means 92 is connected between the cursor positioning means and the video processor 82 to cause the cursor, such as a crosshair, to be displayed at the selected (i,j) coordinates of the display 20 indicated by the cursor positioning means. Optionally, the transverse (or other) slice may be selected by a z- (or other) axis control 94. As the z-control is indexed, slices on a front face of a displayed polyhedral object are "peeled away". That is, the displayed front face is removed and the next plane down becomes the frontmost face of the volumetric region. This enables the operator to peel away successive layers giving the appearance of moving through the volume. This also speeds-up the maximum intensity reprojection of the polyhedral volume. The cursor control 90 increments the i and j-coordinates of the cursor crosshair, causing the cursor to be shifted vertically and horizontally across the video display. The k-coordinate is selected either from the depth measuring means 74 or the z-control 94.

The i, j, and k-coordinate corresponding to the cursor is conveyed to the transform means 60 which performs a reverse of the selected transform on cursor location to transform it from image space to the corresponding x, y, z-coordinate of object space.

A linkage coupling/decoupling means 100 selectively interconnects the operator controls E with the affine transform, a section or slice plane defining means 102, or both. This enables the adjustments of the reprojection and section images to be linked or not linked to the user-adjustable axes. The section defining means 102 includes a first section defining means 104, a second section defining means 106, and a third section defining means 108 to define three mutually orthogonal planes or slices. The definitions control the memory access means 76 such that the memory access means causes the corresponding sectional data to be retrieved from the object volume memory and stored in corresponding portions or view ports of the video memory 84. The operator controls E include a control 110 connected to the video memory 84 for selecting the view port configuration.

As discussed in conjunction with FIGS. 5, 6, and 7 the section planes 104, 106, 108, need not be planar. The operator moves the cursor control 90 on one of the displayed volume reprojection or section projection images and uses it to define corresponding points along a curve, e.g., a curving medial axis. Preferably, the operator uses a mouse or trackball to move the cursor to the selected points and clicks to designate each point. The corresponding points are concurrently stored in a selected point memory 120. A curve interpolator or medial axis delineation means 122 utilizes a spline transform, or the like, to interpolate the selected points into a smooth curve. The smooth curve replaces one of the coordinate axes, e.g., the medial axis, displayed and controlled by the cursor image control 92 and alters the section definition for the corresponding plane or section in the section definition memory 102.

With reference to FIG. 6A, the curve interpolator is also utilized to intersect the polyhedral volume. A reprojected polyhedral volume, when viewed from an angle, is intersected as a polyhedron, e.g., a cube with three visible faces 130, 132, and 134. When selected tissue or air is removed from the image by manipulating the sides of the polyhedral volume, visible image pixels may be on the surface of the polyhedron or inside. By selectively removing sections of the polyhedral volume, the maximum intensity reprojection image, when selected, is sculpted to remove displays which are not of interest or are in the way. As shown in FIG. 6A, the transparency effect of the polyhedral reprojection can display curved shape structures throughout the volume, so that the operator can cross-reference the curved section.

The transformed or image space polygons of the planar polyhedral volume are stored in the image space polygon memory means 70. With reference to FIG. 6B, a video pixel grid superimposing means 142 superimposes the (i,j) grid of available display pixels of the video monitor on the image space polygons in the polygon memory means As shown in FIG. 6A, it is understood that the operator may be viewing a maximum intensity reprojection of the polyhedral volume while specifying the curve. In the illustration of FIG. 6B, the pixel grid is shown exaggeratedly large for simplicity of illustrations. A typical, television quality video monitor might have an array of about 640×512 available display pixels, with higher numbers of pixels on high resolution monitors. A pixel coordinate locating means 144 determines the location relative to each of the transformed polygons corresponding to each display pixel. The affine transform means performs an inverse of the selected transform for each display pixel location (i,j) to define a corresponding (x,y,z) pixel coordinate on the corresponding object space face. The memory access means 76 causes the data values stored in the object memory B which correspond to the eight voxels closest to the inverse transformed voxel coordinate to be retrieved and supplied to the interpolator 80. If the inverse transformed pixel coordinate falls squarely on one of the voxel addresses of the object memory means, no interpolation is necessary. However, more commonly, the pixel coordinate will fall between the eight nearest-neighbor voxel addresses. The interpolating means interpolates the retrieved CT values in accordance with the relative distance between the inverse transformed pixel coordinate and their relative (x,y,z) voxel addresses. This process is repeated for each of the pixels of the video monitor and the resultant CT values are fed to the video processor 82 which creates the appropriate video signal for the video display terminal To adjust the apparent viewing direction of the volume reprojection of the polyhedral volume, the operator adjusts the appropriate one(s) of the operator controls Because only the CT values within the polyhedral volume object image memory are reprojected, the speed of the volume reprojection is increased as the size decreases and the locational specificity is increased.

With reference to FIG. 6C, once the operator has selected the viewing direction for the maximum intensity reprojection of the polyhedral volume, the operator uses the cursor control 90 to designate points in the (i,j) coordinate system which lie along a selected curved cutting surface. The designated points are stored in the selected point memory 120. The cursor image control 90 and the video processor 82 convert each designated point into a corresponding display 152. The smooth curve defining or interpolating means 122 uses a curve generating algorithm, particularly a cubic spline, to generate the remaining points of a smooth curve 156 through each of the specified points. The video processor means 82 causes the smooth curve 156 to be displayed on the video screen (FIG. 6D). If the operator is not satisfied with the shape of the smooth curve, relative to a curve structure seen in the reprojection, the operator adds, deletes, or translates points 152 which define the cutting curve 156 more precisely and the cubic spline or other interpolation algorithm is repeated. The generated curve divides the displayed image of the polyhedral volume region into two (or more) portions. The curve surface can be displayed as a "flattened-out" curved section in one the sectional view ports or can be viewed in a rotatable polyhedral projection. In the latter case, the operator moves the cursor of the curve point selecting means to the portion of the display on one side of the cutting curve, preferably the side portion which is to be displayed after the cutting process, to indicate which portion is to be kept on display. The data values in the non-selected portions cease to be displayed. Because the cutting surface in the preferred embodiment extends parallel to the viewing direction, the cut surfaces are not visible until the operator changes the viewing direction with the resolvers With reference to FIG. 6E, the affine transform means 60 inversely transforms the cutting rays, which are perpendicular to the screen, from the (i,j) image space of the video display to the (x,y,z) object space of the object memory. A representation of the cutting curve 156' in object space is stored in a cutting curve memory or latch 160. An object space cutting curve intersect determining means 162 determines points of intersection 164 between the cutting curve 156' and defined pixels on the faces of the polyhedral volume. More specifically, the cutting curve 156' passes among x, y, z-data addresses 166 on the face 122 in the illustrated FIG. 2 example. Points of intersection 164 are defined along the intersection between the cutting curve 156' and the face 130. Preferably, the points of intersection are spaced a distance commensurate with the distance between adjacent intersection points on the face 130.

In the preferred embodiment, the cutting curve 156 defines a cutting surface which extends perpendicular to the viewing plane, i.e. perpendicular to face of the video screen or parallel to the viewing direction (and therefore the resulting curved axis is at right angles to the other two axis). Because the cutting surface is parallel to the viewing direction, once the memory access means stops addressing voxels in the unwanted portion of the data, no newly cut away surfaces are visible. The affine transform 60 inversely transforms the viewing direction and the viewing direction is also stored in the cutting curve memory 160.

Figure 6F:
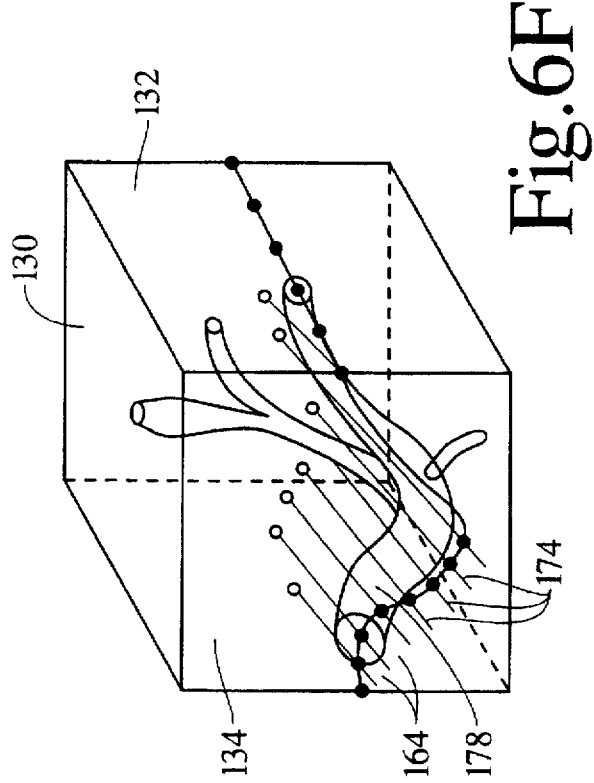

With reference to FIG. 6F, a facet plane defining means 170 includes a ray projecting means which projects a ray 174 through each point of intersection 164 parallel to the inverse affine transformed viewing direction. The facet plane defining means further includes a means 176 for defining the points of intersection 164 with the two object polyhedral volume data faces which each ray intersects. The points of intersection between a pair of adjacent rays 174 and the faces of the volumetric region polygon are the four vertices of a facet plane or polygon 178. The facet plane defining means 170 defines not only the four vertices of each facet plane, but also a designation of which side of the facet plane faces out from the remaining data, i.e. the visible side.

Preferably, a polyhedral coherency test is made as each facet plane is defined. That is, a check is made to determine whether the four entrance and exit points of the two contiguous rays are confined to the previous pair of faces before checking the other faces, or before checking whether the defined facet plane spans an edge between adjacent faces of the object volume.

Figure 6H:
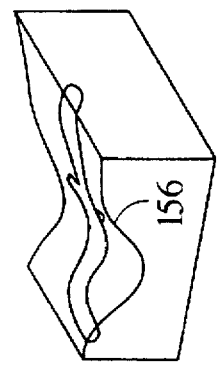
Figure 6G:
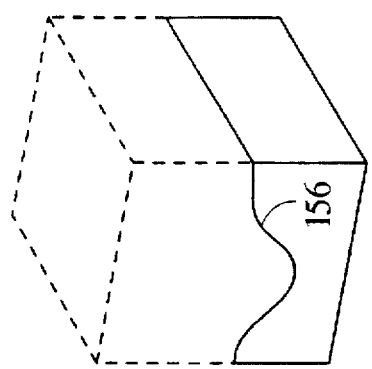

A cut face defining means 180 defines the cut edge along the remaining portion of each cut face. It will be noted, that each face intersected by the cutting surface has at least two vertices, one on each side of the cutting surface. The designation of which portion is to be kept (displayed) and which portion is to be discarded is encoded into the cut face definition to identify which closed circumference is to be displayed (FIG. 6G). Further, the face defining means provides an indication of which of the object volume faces are not cut and are retained and which object volume faces are not cut and are not retained, i.e., lie completely within the discarded portion of the data.

The process discussed here is used to detect when a cutting surface ray exits or enters a particular polygon of the polyhedral volume by crossing a convex face polygon edge. This occurs when a cutting surface ray enters or exits the convex face polyhedron (crosses a polygon's edge) or when the cutting surface ray sequence changes its plane of intersection (crosses a polygon's edge) within the convex polyhedron The polyhedral polygons must have an exit intersection vertex at an edge for each entry intersection vertex at an edge. Accordingly, when a polygon edge is crossed by the cutting curve ray sequence, an edge intersection vertex is computed using the plane formed from the present and the previous rays and the edge of the polygon under consideration. An intersecting vertex is at the intersection between the edge under test and the plane formed from two rays and is contained within the two rays. The edge intersection point is labeled according to the side to keep. The label includes a designation for the intersecting polygon edge and direction to track along the polygon to remain in the side-to-keep when combining the curve cut intersecting vertices with the vertices of the convex polyhedron (faces). The side-to-keep labels for each of the edge intersection vertices are invariant to affine transformations. Vertices of adjacent planes are classified as being inside or outside the side-to-keep. This is used for handling non-intersected faces.

The definitions, e.g. vertices, of the facet planes and the definition of the cut and remaining faces is loaded into a table 182. The cutting curve intersecting vertices and the vertices of the convex polyhedron are combined into a single vertices list for each curve clipped polygon part in object space. This step applies a modified version of the Weiler-Atherton method of clipping a "subject" concave or convex polygon against a "clip" concave or convex polygon by alternatively tracking between the two polygons as their edges are encountered. The process must be able to handle the cases where a curve clipped polygon face has several parts. It is computed in object space so that the computations do not need to be repeated each time the operator rotates the object. For each intersected convex polyhedral plane, the technique starts tracking along the curve intersection points until a polygon edge intersection is encountered. After a polygon edge is encountered, the process starts tracking the vertices of the convex polygon under consideration until another edge intersection is found or until the tracking returns to the starting point. The direction to turn depends on the side-to-keep label of the intersecting edge. The resulting combination of the convex polyhedral planes and the curve-cut intersections are stored in the list of vertices in the table 182 for that plane to be rendered as the curve-clipped polygon part. An exception case occurs when none of the edges of a convex polygon are intersected. In this case, it must be determined if the polygon is in the half space side-to-keep by checking half-space inclusion for the all edges of its adjacent planes. If the non-intersected polygon is in the side-to-keep, all of its vertices are stored for rendering.

Figure 6E:
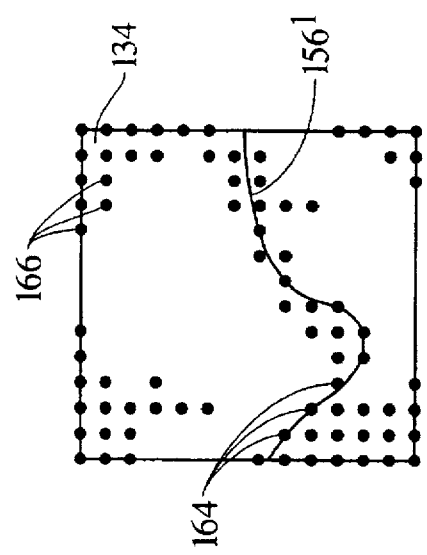

The vertices or other definition of the facet planes and cut faces are transformed by the transform means 60 from object space to image space. With reference to FIG. 6E, as the operator works the input controls E, the facet planes and cut faces are transformed in accordance with the affine transformation of the angle of rotation as discussed above. The surface normal or other designation of the viewable side of the facet planes and the faces further is transformed as well. The direction of the surface normal defines whether a plane is visible from the selected viewing direction. This convention is used if a surface normal points parallel to the viewing plane of the viewing screen or back behind the viewing screen, the plane in question is not visible. If the normal points has a negative z-component, then the plane in question is visible, unless blocked by a closer plane. For each (i,j) image pixel coordinate which falls on one of the visible polygons or planes in the polygon memory 70, the data value locating means 144 causes the relative location within the transformed polygon to be inverse transformed by the transform means 60 to provide an address to the look-up table 182 which identifies the corresponding pixel coordinate in object space. The memory access means 76 retrieves the CT numbers of the eight voxels closest to the pixel coordinate in object space. The interpolating means 80 interpolates the retrieved CT values in inverse proportion to the relative distance between the corresponding voxel and the pixel coordinate. The video image processor converts the interpolated CT values into a perspective image of the selected portion (FIG. 6H). Screen clipping is also used to prevent the displayed object from exceeding the dimensions of the screen when undergoing magnifications and translation.

A hidden surface removal routine 190 identifies rays which purport to pass through two visible surfaces and limits the display to the surface closest to the viewer such that the hidden structure is not superimposed on nor viewed through the displayed structure.

Figure 7A:
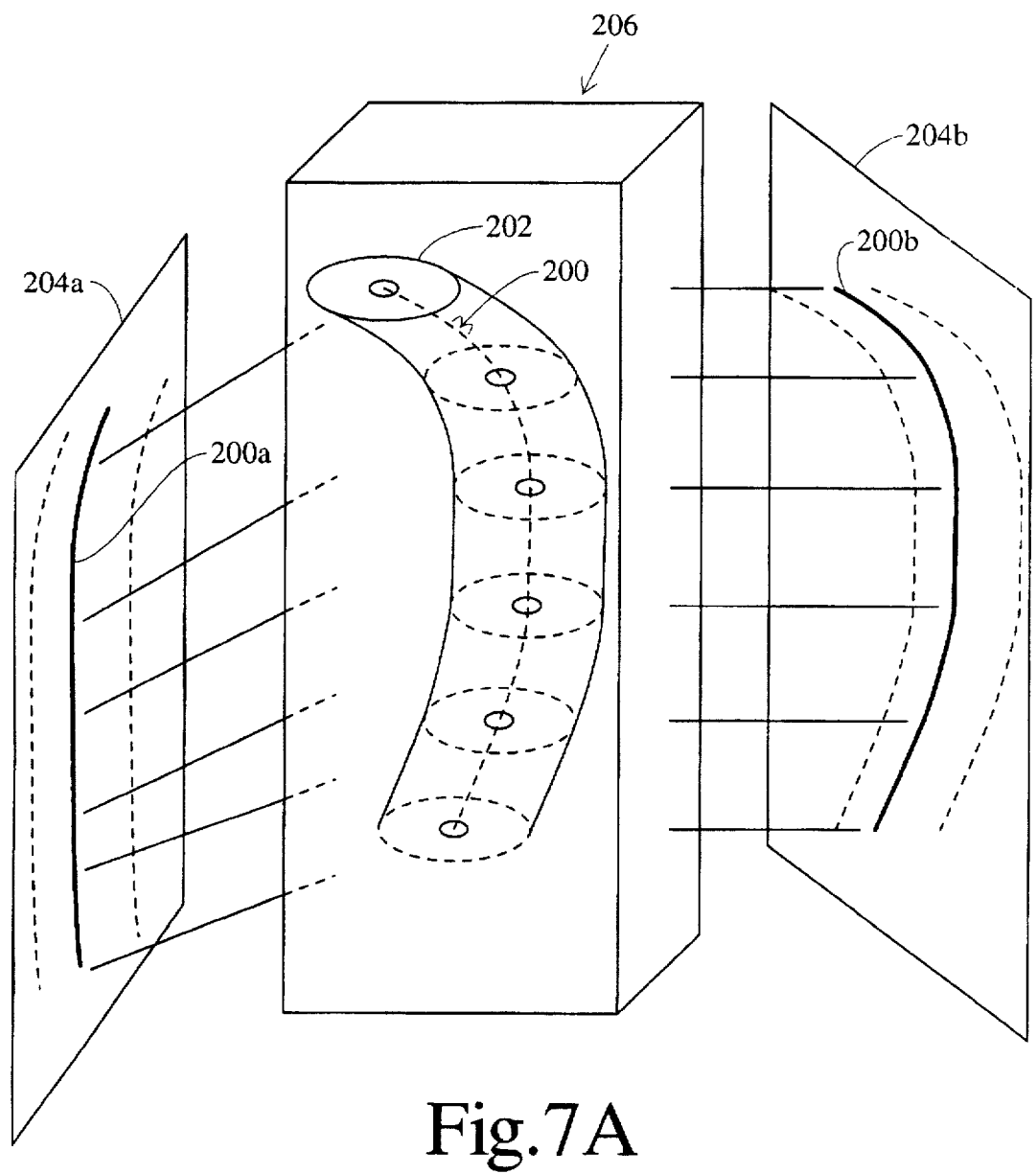
Figure 7B:
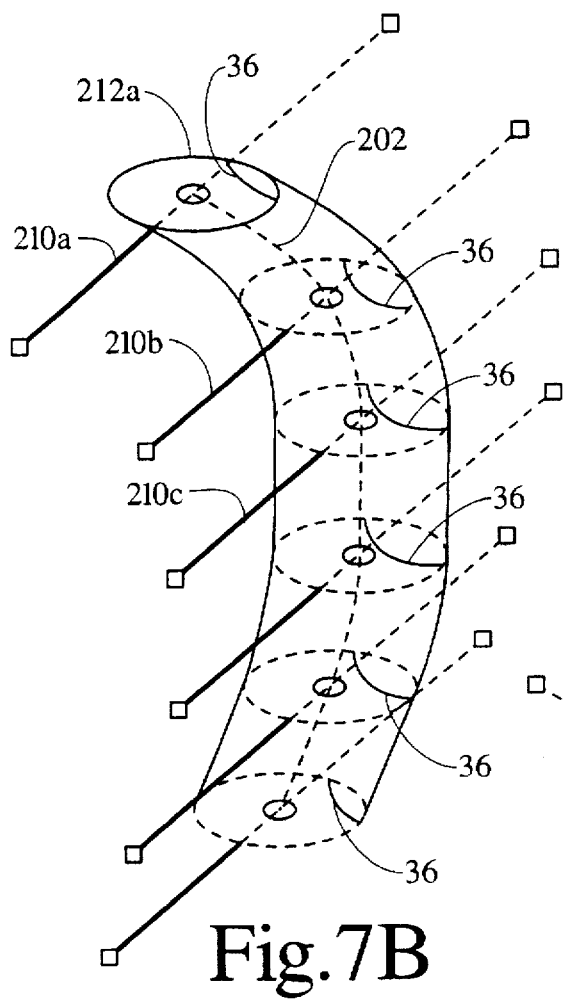

With reference to FIG. 7A, the medial axis delineation means 122 allows the operator to establish a medial axis 200 within a tube-shaped object 202 such as artery. The operator designates a minimum of two curved lines, e.g., curve 200a and curve 200b, superimposed along the 2-D medial axis of two orthogonal reprojection views 204a and 204b of the tube-shaped object. View 204a is a volume reprojection of a planar polyhedral volume 206 containing the tube-shaped object 202. The second reprojection view 204b, which is orthogonal to the first view, is either a volume reprojection or a curved section resulting from the intersection of curve 200a with the planar polyhedral volume. The 2-D curves 200a and 200b are interpolated 122 using splines and extended along their respective viewing directions (back-projected from the viewing screen) to form curved surfaces 204a, 204b which intersect at the 3-D medial axis 200. The 3-D medial axis is formed in by the intersection of the two curved surfaces.

Curved surfaces resulting from curves 200a, 200b can be displayed as curved sections through the volumetric region which longitudinally intersect the 3-D medial axis. The curved sections are based on sets of facets derived from the facet plane defining means 170 which includes the ray projecting means 172 which projects a ray 174 through each point of intersection 164 parallel to the inverse affine transformed viewing direction.

Figure 7C:
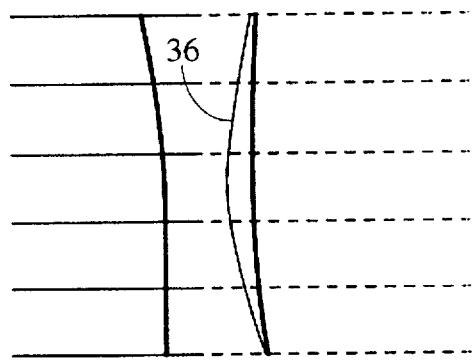
Figure 7D:
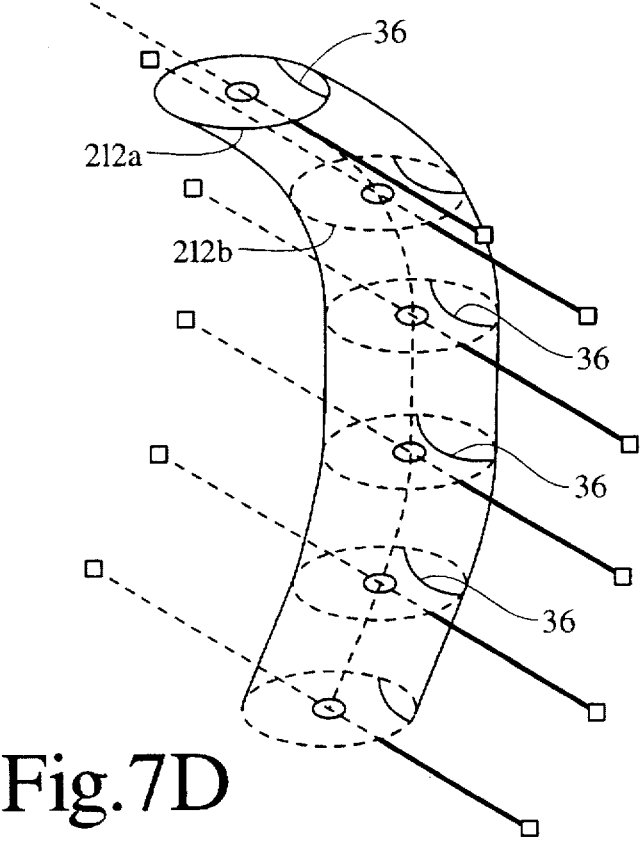

With reference to FIG. 7A, in addition to curved surfaces 204a and 204b, a set of curved surfaces which longitudinally intersect the medial axis 202 are automatically generated. Each curved section is formed by a set rays 210a, 210b, . . . . , parallel with a rotatable viewing direction, e.g. in 10° increments. The rays extend along the rotatable viewing direction, intersect the medial axis, and lie in a common plane about the medial axis. FIG. 7C illustrates a projected version of a longitudinal section showing the progression of the blockage 36 along the vessel. FIG. 7D illustrated the formation of a medial axis longitudinal section at another viewing angle. Alternatively, the curved sections can be formed with rays which are normal to the medial axis and at the same rotation angle about the medial axis.

Also, a set of planar sections 212a, 212b, . . . , are defined which are transverse to the medial axis. Each of the transverse medial axis planes can be used to determine a medial-axis connected set of voxels using a region growing means. This can yield useful cross-sectional area information along the medial axis.

A growing means 220 is connected with the selected point memory 120 and the origin cursor. The medial axis 202 or the origin cursor is used to designate a tissue of interest. The growing means accesses the object volume memory through the image space memory 70 and the transform 60 to ascertain the CT or other image value of the designated pixel. The growing means then searches contiguous pixels for pixels with the same CT or other image value, within a preselected tolerance. The growing means then controls the image processor to cause the designated pixels to be displayed differently from the remainder of the displayed image. For example, the images displayed in all the ports may be displayed in black and white with the grown region displayed in red. As yet another alternative, the grown region may be displayed in darker tones with the remainder of the images displayed in pale tones or not at all. Of course, if only the grown region is to be displayed in the reprojection images, the images are reprojected to remove the effect of intervening structures.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A medical diagnostic imaging system comprising:
   an examined object support which supports a volumetric region of an object an examination region;
   a non-invasive imaging apparatus disposed adjacent the support for non-invasively examining the volumetric region of the object and generating corresponding electronic data values;

a reconstruction processor which reconstructs the data values into voxel values representing the volumetric region;

an object memory for storing the voxel values from the reconstruction processor;

a transform processor for transforming by rotating, scaling, and translating an origin of a coordinate system, axes of the coordinate system, points along a curved axis, and polygonal surfaces from the volumetric region into transformed origins, axes, points, and polygonal surfaces on a viewing plane, the transformed polygonal surfaces representing projections of the volumetric region polygonal surfaces on the viewing plane and for reversely transforming coordinate system origins, axes, points, and surfaces from the viewing plane into corresponding coordinate axes, points, and surfaces in the volumetric region;

a two-dimensional display for generating a two-dimensional human-readable display corresponding to the viewing plane, the human-readable display including a two-dimensional array of pixels, the transform processor reversely transforming the locations of the pixels into corresponding coordinates of the volumetric region;

an image processor for converting the voxel values corresponding to the reversely transformed pixel coordinates into image values displayed at the corresponding pixels of the two-dimensional display as at least one reprojection image;

a cursor position control for selectively positioning a cursor designating an origin and for selectively rotating the axes of a coordinate system on the two-dimensional display, the cursor position control being operatively connected with the image processor for causing the cursor to be displayed at a corresponding cursor location and with the transform processor for reversely transforming the cursor designated origin and axes to corresponding coordinate system origin and axes in the volumetric region;

a section defining means operatively connected with the transform processor for defining at least two mutually orthogonal sections through the volumetric region which intersect at the reversely transformed coordinate system origin and which lie along the coordinate system axes, the voxel values corresponding to the defined orthogonal sections being supplied to the image processor which converts the voxel values corresponding to the section planes into image values which are displayed as section images on the two-dimensional display, whereby the displayed sections change with movement of the cursor;

a volume reprojection defining means operatively connected with the transform processor for defining at least one volume reprojection image of a user adjustable polyhedral volume with viewing direction along a selected axis of the user adjustable coordinate system and view port center defined by the origin the coordinate system;

the cursor designated axes being displayed on both the volume reprojection and section images as a cross-referencing means, the cursor control being operative for selectively translating the origin and dragging and rotating the axes on one of the images;

a means for monitoring the change in cursor position as the axes are dragged;

a rotation calculating means for converting the change in axes position to an indication of rotation, the rotational calculating means being connected with the transform processor such that: 1) the operator adjusts the orientation and position of planar section images by translating the projected origin cursor as well as by rotating the projected axis cursors of the adjustable coordinate system, whereby, the projected cursors are superimposed on a volume reprojection image as a reference guide, and 2) the operator adjusts the viewing directions of the volume reprojection image by rotating the projected axis cursor of the adjustable coordinate system, and the operator adjusts the location of the volume reprojection image's center point which projects to the center of the view port, whereby, the projected cursors are superimposed on a planar section image as a reference guide.

2. The system as set forth in claim 1 further including an operator control including the cursor position control for selectively rotating and translating the volume reprojection and section images;

a linkage control for selectively connecting the operator control with the section defining means and the two-dimensional display generating means such that the section and volume reprojection images are rotatable in two modes: (1) linked such that the section and reprojection images are related across view ports by and cross-referenced with a user adjustable 3-D coordinate-system, whereby each of the three axes represents both a viewing direction and a plane section normal vector and the origin represents both a point common to the section planes and the view port center of the volume reprojection image and (2) unlinked such that the section and volume reprojection images are rotated independently of each other.

3. A medical diagnostic imaging system comprising:

a non-invasive diagnostic apparatus for non-invasively examining a volumetric region of an object and generating data values indicative thereof;

a reconstruction processor which reconstructs the data values into voxel values representing the volumetric region;

an object memory for storing the voxel values from the reconstruction processor;

a transform processor for transforming by rotating, scaling, and translating an origin of a coordinate system, axes of the coordinate system, points along a curved axis, and polygonal surfaces from the volumetric region into transformed origins, axes, points, and polygonal surfaces on a viewing plane, the transformed polygonal surfaces representing projections of the volumetric region polygonal surfaces on the viewing plane and for reversely transforming coordinate system origins, axes, points, and surfaces from the viewing plane into corresponding coordinate axes, points, and surfaces in the volumetric region;

a two-dimensional display for generating a two-dimensional human-readable display corresponding to the viewing plane, the human-readable display including a two-dimensional array of pixels, the transform processor reversely transforming the locations of the pixels into corresponding coordinates of the volumetric region;

an image processor for converting the voxel values corresponding to the reversely transformed pixel coordinates into image values displayed at the corresponding pixels of the two-dimensional display as at least one reprojection image;

a cursor position control for selectively positioning a cursor designating an origin and for selectively rotating the axes of a coordinate system on the two-dimensional display, the cursor position control being operatively connected with the image processor for causing the cursor to be displayed at a corresponding cursor location and with the transform processor for reversely transforming the cursor designated origin and axes to corresponding coordinate system origin and axes in the volumetric region;

a section defining means operatively connected with the transform processor for defining at least two mutually orthogonal sections through the volumetric region which intersect at the reversely transformed coordinate system origin and which lie along the coordinate system axes, the voxel values corresponding to the defined orthogonal sections being supplied to the image processor which converts the voxel values corresponding to the section planes into image values which are displayed as section images on the two-dimensional display, whereby the displayed sections change with movement of the cursor;

a volume reprojection defining means operatively connected with the transform processor for defining at least one volume reprojection image of a user adjustable polyhedral volume with viewing direction along a selected axis of the user adjustable coordinate system and view port center defined by the origin the coordinate system;

a polyhedral intersection system to define curved sections through the polyhedral volume using it's volume reprojection image as a reference guide.

4. The system as set forth in claim 3 further including:

a memory for storing a plurality of designated locations along at least one of the section and reprojection images using the reprojection of the planar polyhedron as a reference guide;

a curve interpolator for interpolating a smooth curve through the designated locations, the curve interpolator being connected with the section defining means for redefining a corresponding section to follow the interpolated smooth curve, whereby one of the designated sections which is non-planar and follows the smooth curve.

5. The system as set forth in claim 3 further including:

a memory for storing a plurality of designated locations along at least one of the section and reprojection images;

a curve interpolator for interpolating a smooth curve through the designated locations, the curve interpolator being connected with a cutting curve selecting means, the cutting curve selecting means being connected with the transform process to be transformed into the volumetric region to remove a selected portion of the reprojection image.

6. The system as set forth in claim 5 further including:

a facet plane defining means for defining facet planes by determining pairs of intersection points between each of a multiplicity of rays passing through the inversely transformed smooth cutting curve and the polygonal surfaces of the polyhedral volumetric region, the facet plane defining means being operatively connected with the transform processor.

7. A medical diagnostic imaging system comprising:

a non-invasive examination system for examining a volume of interest of a patient and generating electronic data values;

a reconstruction processor which reconstructs the data values into voxel values representing the volumetric region;

an object memory for storing the voxel values from the reconstruction processor;

a transform processor for transforming by rotating, scaling, and translating an origin of a coordinate system, axes of the coordinate system, points along a curved axis, and polygonal surfaces from the volumetric region into transformed origins, axes, points, and polygonal surfaces on a viewing plane, the transformed polygonal surfaces representing projections of the volumetric region polygonal surfaces on the viewing plane and for reversely transforming coordinate system origins, axes, points, and surfaces from the viewing plane into corresponding coordinate axes, points, and surfaces in the volumetric region;

a two-dimensional display for generating a two-dimensional human-readable display corresponding to the viewing plane, the human-readable display including a two-dimensional array of pixels, the transform processor reversely transforming the locations of the pixels into corresponding coordinates of the volumetric region;

an image processor for converting the voxel values corresponding to the reversely transformed pixel coordinates into image values displayed at the corresponding pixels of the two-dimensional display as at least one reprojection imaqe;

a cursor position control for selectively positioning a cursor designating an origin and for selectively rotating the axes of a coordinate system on the two-dimensional display, the cursor position control being operatively connected with the image processor for causing the cursor to be displayed at a corresponding cursor location and with the transform processor for reversely transforming the cursor designated origin and axes to corresponding coordinate system origin and axes in the volumetric region;

a section defining means operatively connected with the transform processor for defining at least two mutually orthogonal sections through the volumetric region which intersect at the reversely transformed coordinate system origin and which lie along the coordinate system axes, the voxel values corresponding to the defined orthogonal sections being supplied to the image processor which converts the voxel values corresponding to the section planes into image values which are displayed as section images on the two-dimensional display, whereby the displayed sections change with movement of the cursor;

a volume reprojection defining means operatively connected with the transform processor for defining at least one volume reprojection of a user adjustable polyhedral volume with viewing direction along a selected axis of the user adjustable coordinate system and view port center defined by the origin the coordinate system;

a multiple curved section intersection means for defining a medial axis of a tubed-shaped structure with the volumetric region using one of (1) orthogonal reprojections of a polyhedral volume and (2) a reprojection of the polyhedral volume and a resulting curved section.

8. A medical diagnostic imaging system comprising:

a scanner for non-invasively examining a volumetric region of a patient and generating data values;

a reconstruction processor which reconstructs the data values into voxel values representing the volumetric region;

an object memory for storing the voxel values from the reconstruction processor;

a transform processor for transforming by rotating, scaling, and translating an origin of a coordinate system, axes of the coordinate system, points along a curved axis, and polygonal surfaces from the volumetric region into transformed origins, axes, points, and polygonal surfaces on a viewing plane, the transformed polygonal surfaces representing projections of the volumetric region polygonal surfaces on the viewing plane and for reversely transforming coordinate system origins, axes, points, and surfaces from the viewing plane into corresponding coordinate axes, points, and surfaces in the volumetric region;

a two-dimensional display for generating a two-dimensional human-readable display corresponding to the viewing plane, the human-readable display including a two-dimensional array of pixels, the transform processor reversely transforming the locations of the pixels into corresponding coordinates of the volumetric region;

an image processor for converting the voxel values corresponding to the reversely transformed pixel coordinates into image values displayed at the corresponding pixels of the two-dimensional display as at least one reprojection imaqe;

a cursor position control for selectively positioning a cursor designating an origin and for selectively rotating the axes of a coordinate system on the two-dimensional display, the cursor position control being operatively connected with the image processor for causing the cursor to be displayed at a corresponding cursor location and with the transform processor for reversely transforming the cursor designated origin and axes to corresponding coordinate system origin and axes in the volumetric region;

a section defining means operatively connected with the transform processor for defining at least two mutually orthogonal sections through the volumetric region which intersect at the reversely transformed coordinate system origin and which lie along the coordinate system axes, the voxel values corresponding to the defined orthogonal sections being supplied to the image processor which converts the voxel values corresponding to the section planes into image values which are displayed as section images on the two-dimensional display, whereby the displayed sections change with movement of the cursor;

a volume reprojection defining means operatively connected with the transform processor for defining at least one reprojection of a user adjustable polyhedral volume with viewing direction along a selected axis of the user adjustable coordinate system and view port center defined by the origin the coordinate system;

a region growing means connected with the cursor position control, the region growing means comparing a data value of a voxel contiguous to a medial axis of a tubed-shaped structure within the volumetric region with the voxel values of contiguous voxels to identify a region of contiguous voxels with like data values, the growing means being connected with the image processor such that the region with like voxels values is displayed distinctly from other displayed voxels.

9. An image display system to display curved sections through a polyhedral volume cross-referenced to a volume reprojection image thereof, the system comprising:

an object memory for storing data values representing voxels of a three-dimensional volumetric region, a transform for transforming voxel coordinates of the volumetric region which define polygonal surfaces into transformed polygonal surfaces on a viewing plane, which transformed polygonal surfaces represent volume reprojection images of the volumetric region polygonal surfaces onto the viewing plane and for inversely transforming locations on the viewing plane into corresponding voxel coordinates in the volumetric region, a two-dimensional display for generating a two-dimensional human-readable display, the human-readable display including a two-dimensional array of pixels, the transform inversely transforming locations of the pixels on the view plane into corresponding pixel coordinates in the volumetric region, a plane definition memory for storing definitions of the planes, the plane definitions each defining a multiplicity of data values which correspond to each defined plane, a plane projector for projecting planes as defined by the plane definitions in the plane definition memory to the view plane to define corresponding view plane polygons, for each view plane pixel of each view plane polygon, there being a corresponding data value in the planes as defined by the plane definitions stored in the facet plane definition memory, and an image processor for converting the data values corresponding to the inversely transformed pixel coordinates into image values for display at the corresponding pixels of the two-dimensional display;

a cutting curve selecting means for defining a smooth cutting curve intersecting an adjustable planar polyhedral volume using its volume reprojection image as a reference guide, the cutting curve selecting means being operatively connected with the image processor such that the defined smooth cutting curve is displayed at corresponding pixels on the two-dimensional display, the cutting curve selecting means being connected with the transform such that the defined cutting curve is inversely transformed into corresponding cutting curve coordinates;

a facet plane defining means for defining a multiplicity of facet planes by determining pairs of intersection points between each of a multiplicity of rays passing through the inversely transformed smooth cutting curve and the polygonal surfaces of the volumetric region such that the smooth curves are transformed into a surface of planar facets, the facet plane defining means being operatively connected with the transform and the plane definition memory for storing the facet plane definitions therein.

10. The image display system of claim 9 further including:

a cut face defining means for redefining each surface of the volumetric region which is intersected by at least one of the facet planes, the cut face defining means being operatively connected with the transform;

a look-up table for storing definitions of the facet planes and the cut faces, the look-up table being connected with the facet plane defining means, the cut face defining means, and the transform;

a means for accessing the facet plane and cut face definitions in the look-up table and retrieving corresponding data values from the object memory for transfer to the image processor.

11. An image display system including:
an object memory means for storing data values from a three-dimensional data source representing voxels of a three-dimensional volumetric region; a transform means for transforming polygonal faces of the volumetric region into transformed polygonal faces on a viewing plane, which transformed polygonal faces represent projections of the volumetric region polygonal faces onto the viewing plane and for inversely transforming locations on the viewing plane into corresponding coordinates in the volumetric region; a two-dimensional display for generating a two-dimensional human-readable image corresponding to the viewing plane, the human-readable image including a two-dimensional array of pixels, the transforming means inversely transforming the pixel locations into corresponding pixel coordinates of the volumetric region; an image processor means for converting the data values corresponding to the inversely transformed pixel coordinates into image values displayed at the corresponding pixels of the two-dimensional display a curve point selecting means for selecting points along a cutting curve, the curve point selecting means being operatively connected with the image processor means such that the cutting curve points are displayed at corresponding pixels of the two-dimensional display;

a curve interpolator for interpolating the cutting curve points into a smooth curve, the curve interpolator being connected with the image processor such that the smooth curve is displayed on the two-dimensional display, at least one of the curve point selecting means and the curve interpolator being connected with the transforming means such that at least one of the curve points and the smooth curve are inversely transformed into corresponding cutting curve coordinates of the volumetric region;

a transformed cutting curve memory operatively connected with the transforming means for storing the inversely transformed cutting curve coordinates;

a facet plane defining means for defining facet planes by determining pairs of intersection points between each of a multiplicity of rays passing through the inversely transformed cutting curve and the polygonal faces of the volumetric region;

a cut face defining means for redefining each face of the three-dimensional volumetric region which is intersected by the facet planes;

the facet plane defining means and the cut face defining means being operatively connected with the transforming means for transforming the cut face definitions and the facet planes to corresponding cut face and facet polygons projected onto the viewing plane, the image processor converting data values corresponding to inversely transformed pixel coordinates which correspond to pixels which fall in each of the facet planes and cut faces into image values which are displayed on the two-dimensional display.

12. An image display system comprising:
an object memory which stores voxel values representing a volumetric region;

a transform processor for transforming polygonal surfaces of the volumetric region into transformed polygonal surfaces on a viewing plane which transformed polygonal surfaces represent projections of the volumetric region polygonal surfaces on the viewing plane and for reversely transforming locations on the viewing plane into corresponding coordinates in the volumetric region;

a two-dimensional display for generating a two-dimensional human-readable display corresponding to the viewing plane, the human-readable display including a two-dimensional array of pixels, the transform processor reversely transforming the locations of the pixels into corresponding coordinates of the volumetric region;

an image processor for converting the voxel values corresponding to the reversely transformed pixel coordinates into image values displayed at the corresponding pixels of the two-dimensional display as at least one volume reprojection image;

a cursor position control for selectively positioning a cursor on the two-dimensional display, the cursor position control being operatively connected with the image processor for causing the cursor to be displayed at a corresponding cursor location and with the transform processor for reversely transforming the cursor location to a corresponding cursor coordinate in the volumetric region;

a section defining means operatively connected with the transform processor for defining at least two orthogonal section planes through the volumetric region which intersect at the reversely transformed cursor coordinate, the voxel values corresponding to the defined mutually orthogonal planes being supplied to the image processor which converts the voxel values corresponding to the section planes into image values which are displayed as section images on the two-dimensional display.

13. The system as set forth in claim 12 further including a rotation control for selective operator controlled rotation of at least one of the cross-referenced reprojection and section images.

14. The system as set forth in claim 13 further including:
a cursor controlled means for designating points superimposed on a polyhedral volume's reprojection such that the operator can designate points lying along a curved surface within a polyhedral volume using it's reprojection as a reference guide;

a smooth curve defining means for converting the points into a smooth curve.

15. The system as set forth in claim 14 wherein the smooth curve defining means is connected with the polyhedral intersection means such that the section images are selectively defined to lie along curved rather than flat section planes.

16. The system as set forth in claim 14 wherein the smooth curve defining means is connected with the transform processor and further including:

a transformed cutting curve memory operatively connected with the transform processor for storing inversely transformed cutting curve coordinates;

a facet plane defining means for defining facet planes by determining pairs of intersection points between each of a multiplicity of rays passing through the inversely transformed cutting curve and the polygonal faces of the polyhedral volumetric region;

a cut face defining means for redefining each face of the three-dimensional volumetric region which is intersected by the facet planes;

the facet plane defining means and the cut face defining means being operatively connected with the transform processor for transforming the cut face definitions and the facet planes to corresponding cut face and facet polygons projected onto the viewing plane, the image processor converting voxel values corresponding to inversely transformed pixel coordinates which correspond to pixels which fall in each of the facet planes and cut faces into image values which are displayed on the two-dimensional display.

17. The system as set forth in claim 12 further including a region growing means, the region growing means compares a voxel value corresponding to a voxel intersected by a medial axis with the voxel values of contiguous voxels to identify a region of contiguous voxels with like voxel values, the growing means being connected with the image processor such that the region with like voxel values is displayed distinctly.

18. A diagnostic image processing and display system comprising:
- an object memory which stores voxel values representing a volumetric region;
- a transform processor for transforming polygonal surfaces of the volumetric region into transformed polygonal surfaces on a viewing plane which transformed polygonal surfaces represent protections of the volumetric region polygonal surfaces on the viewing plane and for reversely transforming locations on the viewing plane into corresponding coordinates in the volumetric region;
- a two-dimensional display for generating a two-dimensional human-readable display corresponding to the viewing plane, the human-readable display including a two-dimensional array of pixels, the transform processor reversely transforming the locations of the pixels into corresponding coordinates of the volumetric region;
- an image processor for converting the voxel values corresponding to the reversely transformed pixel coordinates into image values displayed at the corresponding pixels of the two-dimensional display as at least one volume reprojection image;
- a cursor position control for selectively positioning a cursor on the two-dimensional display, the cursor position control being operatively connected with the image processor for causing the cursor to be displayed at a corresponding cursor location and with the transform processor for reversely transforming the cursor location to a corresponding cursor coordinate in the volumetric region;
- a section defining means operatively connected with the transform processor for defining at least two orthogonal section planes through the volumetric region which intersect at the reversely transformed cursor coordinate, the voxel values corresponding to the defined mutually orthogonal planes being supplied to the image processor which converts the voxel values corresponding to the section planes into image values which are displayed as section images on the two-dimensional display;
- a link means for selectively linking the rotation control means to both the transform processor and the section defining means such that the section images and the volume reprojection images are related across view ports by and cross-referenced with a user adjustable 3-D coordinate-system, whereby each of the three axes represents both a viewing direction and a plane section normal vector and the origin represents both a point common to the section planes and the view port center of the volume reprojection images.

19. A method of concurrently displaying cross-referenced volume reprojection and section images, the volume reprojection images being projections of voxel values from a volumetric image representation and the section images being surfaces of voxel values lying along a defined section through the volumetric image representation, the method comprising:
- displaying a cursor origin at a selectable location on a human-readable display;
- displaying a plurality of the volume reprojection and section images on portions of the human-readable display, the cursor being displayed at a corresponding location on each of the reprojection and section images;
- interactively cross-referencing the displayed volume reprojection and section images with each other across view ports by and cross-referenced with a user adjustable 3-D coordinate-system such that each of the three axes can represent both a viewing direction and a plane section normal vector and the origin can represent both a point common to the section planes and the view port center of the reprojection images, the cross-referenced volume reprojection and section images being reciprocally interactive such that adjusting one or more of the coordinate system axes on the section images changes the volume reprojection image and changing one or more of the coordinate system axes on the volume reprojection image changes at least one of the section images.

20. The method as set forth in claim 19 further including three axes through the origin cursor, the rotation being around a selectable one of the three axes.

21. The method as set forth in claim 20 wherein the rotating step includes using the cursor to drag the axes to effect the rotation.

22. The method as set forth in claim 19 further including:
- selecting a voxel at the origin of the user adjustable 3-D-coordinate system intersection in one of the cross-referenced reprojection and section images;
- transforming the pixel to a corresponding voxel in the volumetric image representation;
- comparing a voxel value of the corresponding voxel with voxel values of contiguous voxels to determine a volume of contiguous voxels having substantially the same voxel value;
- inversely transforming the contiguous voxels to pixels on the displayed images and displaying the contiguous region on the displayed images with distinct pixel values.

23. The method as set forth in claim 19 further including defining three axes through the cursor origin and further including redefining at least one of the axes to lie along a curved path such that at least one of the section images and the reprojection image surface lies along a curved surface defined by the curved path.

24. The method as set forth in claim 19 further including:
- defining a plurality of points in at least one of the displayed images;
- interpolating the points into a smooth curve;
- transforming the smooth curve into the volumetric image representation to redefine at least one of the displayed images.

25. The method as set forth in claim 24 further including:
- projecting rays through the transformed smooth cutting curve coordinates and determining pairs of points of intersection with each ray and a pair of faces of the polyhedral volumetric region, pairs of intersection points of adjacent rays each defining a facet plane, intersected faces to one side of the cutting curve coordinates being redefined as cut faces;

after defining the facet planes and the cut faces, storing definitions of the facet planes and cut faces in a look-up table;

moving the viewing plane relative to the volumetric region to another selected perspective;

transforming the facet planes and the cut faces as defined in the look-up table into corresponding facet polygons and cut face polygons representing projections of the facet planes and the cut faces onto the viewing plane;

transforming a location of each pixel of the human-viewable display that is within one of the facet polygons and the cut face polygons from the viewing plane into corresponding pixel coordinates within the facet planes and the cut faces as defined in the look-up table in the volumetric region;

retrieving voxel values corresponding to voxels most closely adjacent the transformed pixel coordinates;

displaying the retrieved data values at corresponding pixels of the human-viewable display.

26. A method to intersect multiple curved sections, which intersect a polyhedral volume, in order to identify a medial axis of a tube-shaped structure, the method comprising:

generating a volumetric image representation corresponding to at least the polyhedral volume, the volumetric image representation including a tube-shaped structure having a medial axis;

generating a first projection of the tube-shaped structure in a first direction;

identifying a curving central axis of the first projection of the tube-shaped structure;

sectioning the polyhedral volume with a first curved cutting section which lies along the central axis of the first projection of the tube-shaped structure;

generating a second projection of the tube-shaped structure in a second direction different from the first direction;

identifying a curving central axis of the second projection of the tube-shaped structure;

sectioning the polyhedral volume with a second curved cutting section which lies along the central axis of the second projection of the tube-shaped structure, such that the first and second cutting sections intersect along the medial axis;

a curved line of intersection between the first and second cutting sections identifying the medial axis of the tube-shaped structure.

27. A method set forth in claim 26 further including automatically generating a sequence of straight or curved longitudinal sections which intersect and have angular-spaced normal vectors perpendicular to the medial axis of a tubed-shaped structure.

28. A method set forth in claim 26 further including generating a sequence of volume reprojections can be automatically generated side-by-side or in rapid cine which have regularly spaced viewing directions perpendicular to the medial axis at least at one point of interest along the medial axis of a tubed-shaped structure.

29. A method set forth in claim 26 further including generating a set of sections which are transverse to the medial axis, for a tube-shaped object.

30. A method set forth in claim 26 further including generating a set of viewing directions segmentally coincidental with the medial axis to generate a volume projective or shaded surface fly-through, while using a selected transverse section as a cross-reference guide.

31. A method set forth in claim 26 further including determining the cross-sectional area of a tube-shaped object at selected or regular intervals along the medial axis of the object for subsequent plotting in cartesian coordinates.

* * * * *